US012630196B2

(12) United States Patent
Tremblay

(10) Patent No.: US 12,630,196 B2
(45) Date of Patent: **\*May 19, 2026**

(54) SYSTEMS AND METHODS FOR AUTONOMOUS VEHICLES

(71) Applicant: Martin Tremblay, Montreal (CA)

(72) Inventor: Martin Tremblay, Montreal (CA)

( \* ) Notice: Subject to any disclaimer, the term of this patent is extended or adjusted under 35 U.S.C. 154(b) by 0 days.

This patent is subject to a terminal disclaimer.

(21) Appl. No.: 19/031,734

(22) Filed: Jan. 18, 2025

(65) Prior Publication Data

US 2025/0164990 A1 May 22, 2025

Related U.S. Application Data

(63) Continuation of application No. 18/301,211, filed on Apr. 15, 2023, which is a continuation of application (Continued)

(51) Int. Cl.
B60W 60/00 (2020.01)
B60W 40/08 (2012.01)
(Continued)

(52) U.S. Cl.
CPC .......... B60W 60/007 (2020.02); B60W 40/08 (2013.01); B60W 60/00136 (2020.02); (Continued)

(58) Field of Classification Search
None
See application file for complete search history.

(56) References Cited

U.S. PATENT DOCUMENTS

2010/0235034 A1\* 9/2010 Higgins .................. G06F 3/017
701/28
2015/0367854 A1\* 12/2015 Ezoe ............... B60W 30/18163
701/1

(Continued)

*Primary Examiner* — Jennifer M Anda

(57) ABSTRACT

An autonomous vehicle configured to facilitate its use and/or enhance what it and/or occupants can do with it, such as, for example, by: autonomously acting based on events within the autonomous vehicle, including by autonomously rerouting itself, altering a cabin of the autonomous vehicle, notifying a third party external to the autonomous vehicle, stopping (e.g., parking) the autonomous vehicle, altering how the autonomous vehicle drives itself, and/or performing other actions based on what and/or how an occupant is doing, an emergency, or another event occurring in the cabin of the autonomous vehicle; autonomously acting based on interactions with (e.g., gestures of) humans (e.g., police officers, school-crossing guards, traffic guards at roadwork or other temporary traffic control sites, drivers of other vehicles, etc.) external to the autonomous vehicle; autonomously acting based on indicators placed at particular locations (e.g., drive-through establishments, potholes, parking spots, etc.); facilitating acts of occupants in the cabin of the autonomous vehicle, such as acts unrelated to and normally not done while driving, including, for example, sleeping, exercising, working, eating, cooking, and/or any other suitable act; and/or automatically personalizing the autonomous vehicle for an occupant (e.g., a configuration of the cabin, a self-driving mode, a destination and/or a route, etc.).

20 Claims, 32 Drawing Sheets

Related U.S. Application Data

No. 16/279,778, filed on Feb. 19, 2019, now Pat. No. 11,971,714.

(60) Provisional application No. 62/631,941, filed on Feb. 19, 2018.

(51) Int. Cl.

| | |
|---|---|
| *G01C 21/34* | (2006.01) |
| *G05D 1/81* | (2024.01) |
| *G06V 20/59* | (2022.01) |
| *G07C 5/00* | (2006.01) |

(52) U.S. Cl.

CPC ........... *G01C 21/3415* (2013.01); *G05D 1/81* (2024.01); *G06V 20/597* (2022.01); *G07C 5/008* (2013.01); *B60W 2040/0818* (2013.01); *B60W 2040/0872* (2013.01)

(56) References Cited

U.S. PATENT DOCUMENTS

| | | | |
|---|---|---|---|
| 2016/0144867 A1* | 5/2016 | Delp | B60W 30/181 |
| | | | 701/28 |
| 2016/0318518 A1* | 11/2016 | Suzuki | B60W 50/0097 |
| 2017/0084175 A1* | 3/2017 | Sedlik | B60W 40/04 |
| 2018/0082134 A1* | 3/2018 | Sivaraman | G06V 40/28 |
| 2018/0143644 A1* | 5/2018 | Li | G06V 40/107 |
| 2018/0299283 A1* | 10/2018 | Wang | G01C 21/3602 |
| 2019/0236341 A1* | 8/2019 | Nallapa | G05D 1/0257 |

* cited by examiner

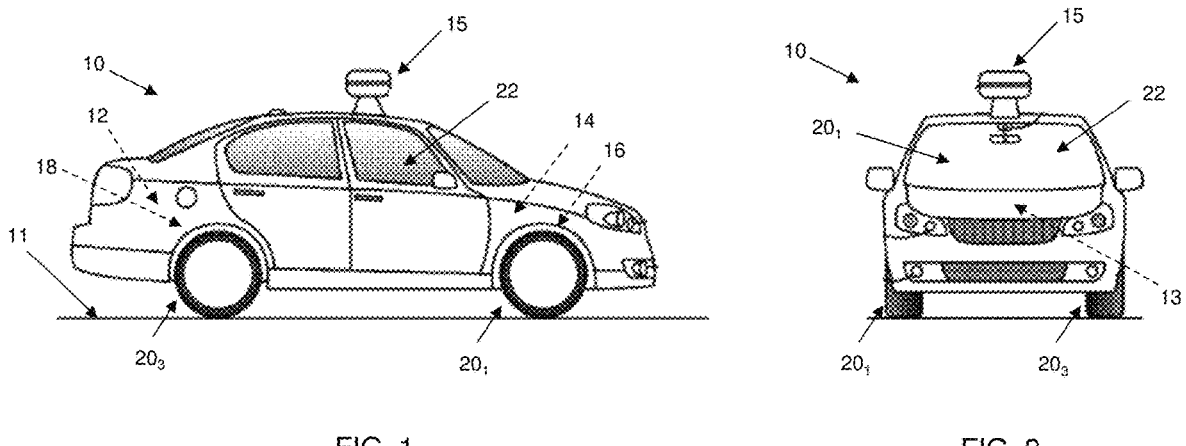
FIG. 1                    FIG. 2

| Monitor occupant |
|---|

↓

| Detect actionable event based on state of occupant |
|---|

↓

| Cause vehicle to autonomously perform action(s) |
|---|

Light blocker
27

Window covering
23

FIG. 15

Light blocker
27

Window transmissivity changer
25

FIG. 16

310 Receive sensory data

320 Recognize human protocol gesture

330 Cause vehicle to perform prescribed action

Indicator
89ₓ

Visual element
95

Supporting portion
97

FIG. 35

Indicator
89ₓ

Transmitter
98

FIG. 36

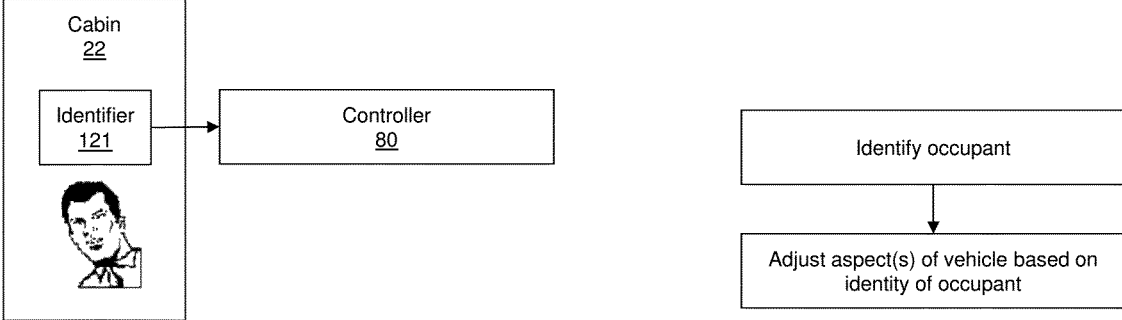
FIG. 40                                    FIG. 41

SYSTEMS AND METHODS FOR AUTONOMOUS VEHICLES

CROSS-REFERENCE TO RELATED APPLICATIONS

This application is a continuation of U.S. patent application Ser. No. 18/301,211 filed on Apr. 15, 2023, which is a continuation of U.S. patent application Ser. No. 16/279,778 filed on Feb. 19, 2019 and issued as U.S. Pat. No. 11,971, 714, which claims priority from U.S. Provisional Patent Application 62/631,941 filed on Feb. 19, 2018.

FIELD

This disclosure generally relates to autonomous vehicles (e.g., autonomous automobiles, trucks and other road vehicles).

BACKGROUND

Autonomous vehicles (sometimes referred to as a "self-driving" or "driverless" vehicles), such as autonomous automobiles, trucks and other road vehicles, are operable without human control, including by steering, accelerating, and decelerating (e.g., braking) autonomously without human control, to travel to a destination.

While autonomous vehicles can provide many benefits such as increased safety, reduced traffic and more free time, there may also be issues or opportunities arising in respect of autonomous vehicles which may not arise with or be less relevant for conventional vehicles driven by human drivers.

For these and other reasons, there is a need for improvements directed to autonomous vehicles.

SUMMARY

According to various aspects of this disclosure, there is provided an autonomous vehicle configured to facilitate its use and/or enhance what it and/or occupants can do with it, such as, for example, by: autonomously acting based on events within the autonomous vehicle, including by autonomously rerouting itself, altering a cabin of the autonomous vehicle, notifying a third party external to the autonomous vehicle, stopping (e.g., parking) the autonomous vehicle, altering how the autonomous vehicle drives itself, and/or performing other actions based on what and/or how an occupant is doing, an emergency, or another event occurring in the cabin of the autonomous vehicle; autonomously acting based on interactions with (e.g., gestures of) humans (e.g., police officers, school-crossing guards, traffic guards at roadwork or other temporary traffic control sites, drivers of other vehicles, etc.) external to the autonomous vehicle; autonomously acting based on indicators placed at particular locations (e.g., drive-through establishments, potholes, parking spots, etc.); facilitating acts of occupants in the cabin of the autonomous vehicle, such as acts unrelated to and normally not done while driving, including, for example, sleeping, exercising, working, eating, cooking, and/or any other suitable act; and/or automatically personalizing the autonomous vehicle for an occupant (e.g., a configuration of the cabin, a self-driving mode, a destination and/or a route, etc.).

For example, in accordance with an aspect, this disclosure relates to an autonomous vehicle comprising a control system configured to cause the autonomous vehicle to autonomously perform an action based on an event within the autonomous vehicle.

In accordance with another aspect, this disclosure relates to an autonomous vehicle comprising a cabin and a control system configured to cause the autonomous vehicle to autonomously perform an action based on an event in the cabin.

In accordance with another aspect, this disclosure relates to an autonomous vehicle comprising a cabin and a control system configured to cause the autonomous vehicle to autonomously perform an action based on a state of an occupant in the cabin.

In accordance with another aspect, this disclosure relates to an autonomous vehicle comprising a control system configured to cause the autonomous vehicle to autonomously perform an action based on an interaction with a human external to the autonomous vehicle.

In accordance with another aspect, this disclosure relates to an autonomous vehicle comprising a control system configured to cause the autonomous vehicle to autonomously perform an action based on a human protocol gesture made by a human external to the autonomous vehicle.

In accordance with another aspect, this disclosure relates to an autonomous vehicle comprising a cabin and a control system configured to personalize the autonomous vehicle based on an identity of an occupant in the cabin.

In accordance with another aspect, this disclosure relates to an autonomous vehicle comprising a cabin, a control system configured to operate the autonomous vehicle, and an occupant-act facilitator configured to facilitate an act of an occupant in the cabin unrelated to and normally not done while driving.

In accordance with another aspect, this disclosure relates to an autonomous vehicle comprising a sleeping facilitator configured to facilitate sleeping of an occupant in a cabin of the autonomous vehicle.

In accordance with another aspect, this disclosure relates to an autonomous vehicle comprising a working facilitator configured to facilitate work of an occupant in a cabin of the autonomous vehicle by providing a workspace for the occupant.

In accordance with another aspect, this disclosure relates to an autonomous vehicle comprising an excising facilitator configured to facilitate exercising of an occupant in a cabin of the autonomous vehicle by providing an exerciser for the occupant.

In accordance with another aspect, this disclosure relates to an autonomous vehicle comprising an eating facilitator configured to facilitate eating by an occupant in a cabin of the autonomous vehicle by providing an eating area for the occupant.

In accordance with another aspect, this disclosure relates to an autonomous vehicle comprising a cooking facilitator configured to facilitate cooking by an occupant in a cabin of the autonomous vehicle by providing a cooking area for the occupant.

In accordance with another aspect, this disclosure relates to a system for an autonomous vehicle, in which the system is configured to cause the autonomous vehicle to autonomously perform an action based on an event within the autonomous vehicle.

In accordance with another aspect, this disclosure relates to a system for an autonomous vehicle, in which the system is configured to cause the autonomous vehicle to autonomously perform an action based on an event in a cabin of the autonomous vehicle.

In accordance with another aspect, this disclosure relates to a system for an autonomous vehicle, in which the system is configured to cause the autonomous vehicle to autonomously perform an action based on a state of an occupant in a cabin of the autonomous vehicle.

In accordance with another aspect, this disclosure relates to a system for an autonomous vehicle, in which the system is configured to cause the autonomous vehicle to autonomously perform an action based on an interaction with a human external to the autonomous vehicle.

In accordance with another aspect, this disclosure relates to a system for an autonomous vehicle, in which the system is configured to cause the autonomous vehicle to autonomously perform an action based on a human protocol gesture made by a human external to the autonomous vehicle.

In accordance with another aspect, this disclosure relates to a system for autonomous vehicle, in which the system is configured to personalize the autonomous vehicle based on an identity of an occupant in a cabin of the autonomous vehicle.

In accordance with another aspect, this disclosure relates to a sleeping facilitator for autonomous vehicle, in which the sleeping facilitator is configured to facilitate sleeping of an occupant in a cabin of the autonomous vehicle.

In accordance with another aspect, this disclosure relates to a working facilitator for an autonomous vehicle, in which the working facilitator is configured to facilitate work of an occupant in a cabin of the autonomous vehicle by providing a workspace for the occupant.

In accordance with another aspect, this disclosure relates to an exercising facilitator for an autonomous vehicle, in which the excising facilitator is configured to facilitate exercising of an occupant in a cabin of the autonomous vehicle by providing an exerciser for the occupant.

In accordance with another aspect, this disclosure relates to an eating facilitator for an autonomous vehicle, in which the eating facilitator is configured to facilitate eating by an occupant in a cabin of the autonomous vehicle by providing an eating area for the occupant.

In accordance with another aspect, this disclosure relates to a cooking facilitator for an autonomous vehicle, in which the cooking facilitator is configured to facilitate cooking by an occupant in a cabin of the autonomous vehicle by providing a cooking area for the occupant.

In accordance with another aspect, this disclosure relates to an indicator configured to be placed at a particular location external to an autonomous vehicle and recognized by a control system of the autonomous vehicle such that the control system autonomously operates the autonomous vehicle at the particular location based on recognition of the indicator.

These and other aspects of this disclosure will now become apparent upon review of a description of embodiments that follows in conjunction with accompanying drawings.

BRIEF DESCRIPTION OF DRAWINGS

A detailed description of embodiments is provided below, by way of example only, with reference to accompanying drawings, in which:

FIGS. 1 to 4 show an embodiment of an autonomous vehicle;

FIGS. 13 to 16 show an embodiment of altering the cabin of the autonomous vehicle;

FIGS. 34 to 39 show embodiments of indicators placed at particular locations and recognizable by the control system of the autonomous vehicle such that the control system autonomously operates the autonomous vehicle at these particular locations based on recognition of the indicators; and FIGS. 40 to 42 show an embodiment in which the autonomous vehicle is personalized for an occupant based on an identity of the occupant.

Figure 3:
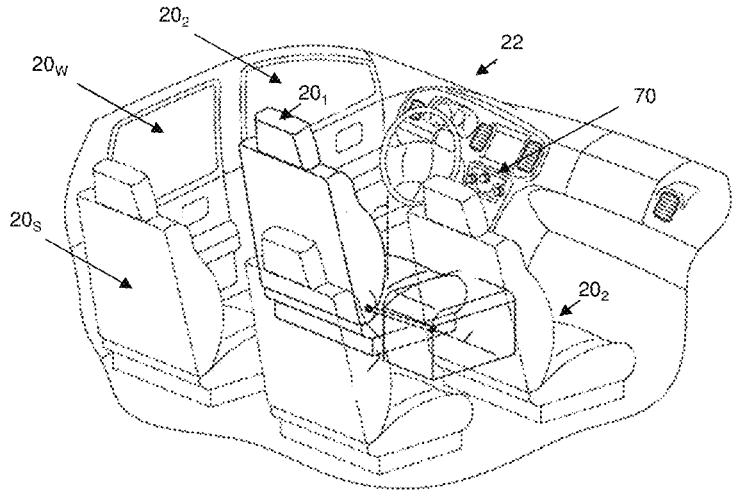
Figure 4:
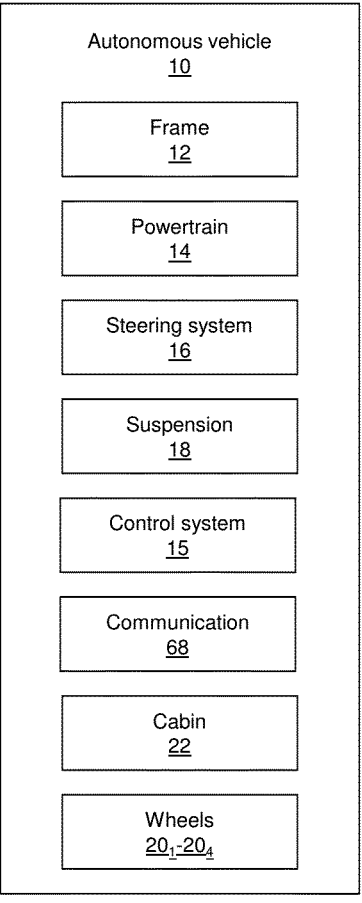
Figure 5:
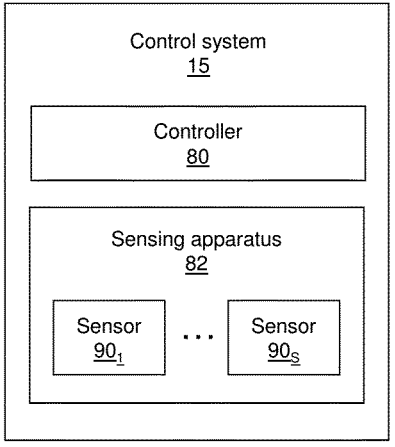
FIGS. 5 and 6 show an embodiment of a control system of the autonomous vehicle.

It is to be expressly understood that the description and drawings are only for purposes of illustrating certain embodiments and are an aid for understanding. They are not intended to be limitative.

DETAILED DESCRIPTION OF EMBODIMENTS

FIGS. 1 to 5 show an example of an embodiment of an autonomous vehicle 10 on a road 11. The autonomous vehicle 10 is designed to legally carry people or cargo on the road 11, which is part of a public road infrastructure (e.g., public streets, highways, etc.). In this embodiment, the autonomous vehicle 10 is an automobile (e.g., a passenger car). In other embodiments, the autonomous vehicle 10 may be an autonomous truck, an autonomous bus, or any other autonomous road vehicle. The autonomous vehicle 10 (sometimes referred to as a "self-driving" or "driverless" vehicle) is operable without human control, including by steering, accelerating, and decelerating (e.g., braking) itself autonomously without human control, to travel to a destination. Although it can drive itself, in some embodiments, the autonomous vehicle 10 may be controlled by a human driver in some situations.

In this embodiment, the autonomous vehicle 10 comprises a frame 12, a powertrain 14, a steering system 16, a suspension 18, wheels $20_1$-$20_4$, a cabin 22, and a control system 15 that is configured to operate the vehicle 10 autonomously (i.e., without human control). The autonomous vehicle 10 has a longitudinal direction, a widthwise direction, and a heightwise direction.

As further discussed later, in various embodiments, the autonomous vehicle 10 may be configured to facilitate its use and/or enhance what it and/or occupants can do with it, such as, for example, by:

autonomously acting based on events within the vehicle 10, including by autonomously rerouting itself, altering the cabin 22, notifying a third party external to the vehicle 10, stopping (e.g., parking) the vehicle 10, altering how the vehicle 10 drives itself, and/or performing other actions based on what and/or how an occupant is doing, an emergency, or another event occurring in the cabin 22;

autonomously acting based on interactions with (e.g., gestures of) humans (e.g., police officers, school-crossing guards, traffic guards at roadwork or other temporary traffic control sites, drivers of other vehicles, etc.) external to the vehicle 10;

autonomously acting based on indicators placed at particular locations (e.g., drive-through establishments, potholes, parking spots, etc.);

facilitating acts of occupants in the cabin 22, such as acts unrelated to and normally not done while driving, including, for example, sleeping, exercising, working, eating, cooking, and/or any other suitable act; and/or automatically personalizing the vehicle 10 for an occupant (e.g., a configuration of the cabin 22, a self-driving mode, a destination and/or a route, etc.).

The powertrain 14 is configured to generate power for the autonomous vehicle 10, including motive power for the wheels $20_1$-$20_4$ to propel the vehicle 10 on the road 11. To that end, the powertrain 14 comprises a power source 13 (e.g., a primer mover) that includes one or more motors. For example, in some embodiments, the power source 13 may comprise an electric motor (e.g., powered by a battery), an internal combustion engine, or a combination of different types of motor (e.g., an electric motor and an internal combustion engine). The powertrain 14 can transmit power from the power source 13 to one or more of the wheels $20_1$-$20_4$ in any suitable way (e.g., via a transmission, a differential, a shaft engaging (i.e., directly connecting) a motor and a given one of the wheels $20_1$-$20_4$, etc.).

The steering system 16 is configured to steer the autonomous vehicle 10 on the road 11. In this embodiment, the steering system 16 is configured to turn front ones of the wheels $20_1$-$20_4$ to change their orientation relative to the frame 12 of the vehicle 10 in order to cause the vehicle 10 to move in a desired direction.

The suspension 18 is connected between the frame 12 and the wheels $20_1$-$20_4$ to allow relative motion between the frame 12 and the wheels $20_1$-$20_4$ as the autonomous vehicle 10 travels on the road 11. For example, the suspension 18 may enhance handling of the vehicle 10 on the road 11 by absorbing shocks and helping to maintain traction between the wheels $20_1$-$20_4$ and the road 11. The suspension 18 may comprise an arrangement of springs and dampers. A spring may be a coil spring, a leaf spring, a gas spring (e.g., an air spring), or any other elastic object used to store mechanical energy. A damper (also sometimes referred to as a "shock absorber") may be a fluidic damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydro-pneumatic device).

The cabin 22 is configured to be occupied by one or more occupants of the autonomous vehicle 10. In this embodiment, the cabin 22 comprises windows $21_1$-$21_W$, seats $20_1$-$20_S$, and a user interface 70 that is configured to interact with one or more occupants of the vehicle 10. The user interface 70 comprises an input portion 71 including one or more input devices (e.g., a set of buttons, levers, dials, etc., a touchscreen, a microphone, etc.) allowing an occupant of the vehicle 10 to input commands and/or other information into the vehicle 10 and an output portion 73 including one or more output devices (e.g., a display, a speaker, etc.) to provide information to an occupant of the vehicle 10. The output portion 73 of the user interface 70 which may comprise an instrument panel (e.g., a dashboard) which provides indicators (e.g., a speedometer indicator, a tachometer indicator, etc.) related to operation of the vehicle 10.

The control system 15 is configured to operate the autonomous vehicle 10, including to steer, accelerate, and decelerate (e.g., brake) the autonomous vehicle 10, autonomously (i.e., without human control) as the autonomous vehicle 10 progresses to a destination along a route on the road 11. To that end, the control system 15 comprises a controller 80 and a sensing apparatus 82 to perform actions controlling the vehicle 10 (e.g., actions to steer, accelerate, decelerate, etc.) to move it towards its destination on the road 11 based on a computerized perception of an environment of the vehicle 10.

While its control system 15 enables it to drive itself, the autonomous vehicle 10 may be controlled by a human driver, such as an occupant in the cabin 22, in some situations. For example, in some embodiments, the control system 15 may allow the autonomous vehicle 10 to be selectively operable either autonomously (i.e., without human control) or under human control (i.e., by a human driver) in various situations (e.g., the autonomous vehicle 10 may be operable in either of an autonomous operational mode and a human-controlled operational mode). For instance, in this embodiment, the user interface 70 of the cabin 22 may comprise an accelerator 31 (e.g., an acceleration pedal), a braking device 33 (e.g., a brake pedal), and a steering device 35 (e.g., a steering wheel) that can be operated by a human driver in the cabin 22 to control the vehicle 10 on the road 11.

Figure 6:
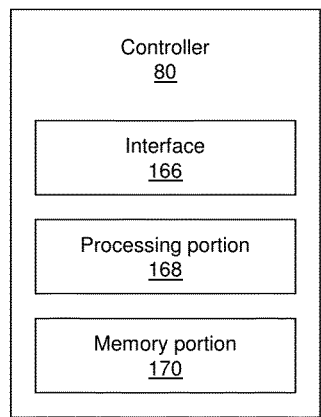

The controller 80 is a processing apparatus configured to process information received from the sensing apparatus 82 and possibly other sources in order to perform actions controlling the autonomous vehicle 10, including to steer, accelerate, and decelerate the vehicle 10, towards its destination on the road 11. With additional reference to FIG. 6, in this embodiment, the controller 80 comprises an interface 166, a processing portion 168, and a memory portion 170, which are implemented by suitable hardware and software.

The interface 166 comprises one or more inputs and outputs allowing the controller 80 to receive input signals from and send output signals to other components to which the controller 80 is connected (i.e., directly or indirectly connected), including the sensing apparatus 82, the powertrain 14, and the steering system 16, and possibly other components such as the user interface 70, a communication interface 68 configured to communicate over a communication network (e.g., a cellular, WiFi, or other wireless network, for internet and/or other communications), over one or more local communication links (e.g., BlueTooth™, USB, etc.), and/or with one or more other vehicles that are near the autonomous vehicle 10 (i.e., for inter-vehicle communications), etc.

The processing portion 168 comprises one or more processors for performing processing operations that implement functionality of the controller 80. A processor of the processing portion 168 may be a general-purpose processor executing program code stored in the memory portion 170. Alternatively, a processor of the processing portion 168 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 170 comprises one or more memories for storing program code executed by the processing portion 168 and/or data (e.g., maps, vehicle parameters, etc.) used during operation of the processing portion 168. A memory of the memory portion 170 may be a semiconductor medium (including, e.g., a solid-state memory), a magnetic storage medium, an optical storage medium, and/or any other suitable type of memory. A memory of the memory portion 170 may be read-only memory (ROM) and/or random-access memory (RAM), for example.

In some embodiments, the controller 80 may comprise and/or interact with one or more other control units of the autonomous vehicle 10. For example, in some embodiments, the controller 80 may comprise and/or interact with a powertrain control unit of the powertrain 14, such as an engine control unit (ECU), a transmission control unit (TCU), etc.

The sensing apparatus 82 comprises a set of sensors $90_1$-$90_S$ to sense aspects of the environment of the vehicle 10 and generate sensor information indicative of these aspects of the environment of the vehicle 10 that is provided to the controller 80 in order to control the vehicle 10 towards its destination on the road 11. The sensor information can be used by the controller 80 to determine actions which are to be performed by the autonomous vehicle 10 in order for the vehicle 10 to continue to its destination. The sensors $90_1$-$90_S$ can provide situational information proximate to the vehicle 10, including any potential hazards proximate to the vehicle 10.

The sensors $90_1$-$90_S$ may include any suitable sensing device. For instance, in some embodiments, the sensors $90_1$-$90_S$ may comprise a camera (e.g., video, stereoscopic, etc.) and/or other imaging device, a Light Detection and Ranging (LIDAR) device, a radar device, a wheel speed sensor, a GPS and/or other location sensor, and/or any other suitable sensing device.

The autonomous vehicle 10 may be implemented in any suitable way. For example, in some embodiments, the autonomous vehicle 10, including its control system 15, may be implemented as a Waymo™ vehicle such as that described at waymo.com/tech/ and waymo.com/safetyreport/, a Uber™ vehicle such as that described at www.uber-.com/cities/pittsburgh/self-driving-ubers/, a vehicle such as that described in U.S. Pat. No. 8,818,608 or U.S. Patent Application Publication 2014/0303827.

In some cases, the autonomous vehicle 10 may be for personal or private use by a user (e.g., where the vehicle 10 is owned or leased by the user or another individual personally known to the user, such as a family member, a friend, etc.). In other cases, the autonomous vehicle 10 may be for public use by various users, such as where the vehicle 10 is used as part of a taxi, ride-hailing or vehicle-sharing service.

The autonomous vehicle 10 may be configured to facilitate its use and/or enhance what it and/or occupants can do with it. Examples of embodiments of this are described below.

1. Autonomously Acting Based on Event Within Vehicle (e.g., Inside Cabin)

Figure 7:
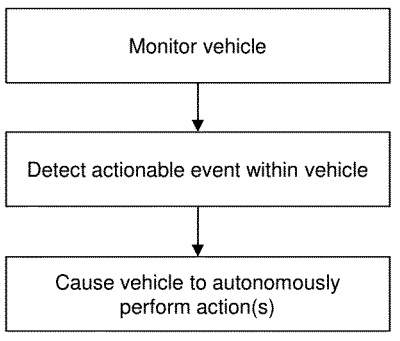
FIG. 7 shows an embodiment of monitoring the autonomous vehicle and causing the autonomous vehicle to perform one or more actions in response to detecting an actionable event within the autonomous vehicle.

In some embodiments, as shown in FIG. 7, the control system 15 of the autonomous vehicle 10 may be configured to cause the vehicle 10 to autonomously perform one or more actions based on one or more events within the vehicle 10.

For example, in this embodiment, the control system 15 may be configured to cause the vehicle 10 to autonomously reroute itself (i.e., change its destination and/or its current route), alter the cabin 22, notify a third party external to the vehicle 10, stop (e.g., park) the vehicle 10, alter how the vehicle 10 drives itself, and/or perform one or more other actions based on what and/or how an occupant is doing, an emergency, or another event occurring in the cabin 22 of the vehicle 10.

Figure 8:
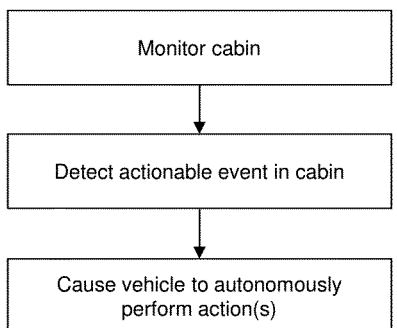
FIG. 8 shows an embodiment of monitoring a cabin of the autonomous vehicle and causing the autonomous vehicle to perform one or more actions in response to detecting an actionable event in the cabin.

More particularly, in this embodiment, as shown in FIG. 8, the control system 15 is configured to monitor an interior of the cabin 22 and, in response to detecting an actionable event in the cabin 22, cause the vehicle 10 to autonomously reroute itself and/or perform one or more other actions to address that event.

An actionable event in the cabin 22 in response to which the control system 15 causes the autonomous vehicle 10 to reroute itself and/or perform one or more other actions may involve one or more conditions being met (e.g., one or more circumstances having arisen) in the cabin 22. Any or all of these one or more conditions may be predefined or otherwise specified such that, when the one or more conditions are met, the actionable event is deemed to have occurred in the cabin 22.

Detection that one or more conditions are met in the cabin 22, and therefore detection of an actionable event in the cabin 22, may be carried out by the controller 80. This may be achieved based on processing of input information that may be received by the controller 80. Examples of such input information may include information received via the user interface 70, the communication interface 68, and/or possibly from other sources (e.g., one or more sensors in the cabin 22).

When an actionable event in the cabin 22 is detected, the controller 80 responds by effecting one or more actions to address that event. For example, the controller 80 may issue one or more control signals to the powertrain 14, the steering system 16, the user interface 70, the communication interface 68, and/or possibly other devices.

Figures 9, 10:
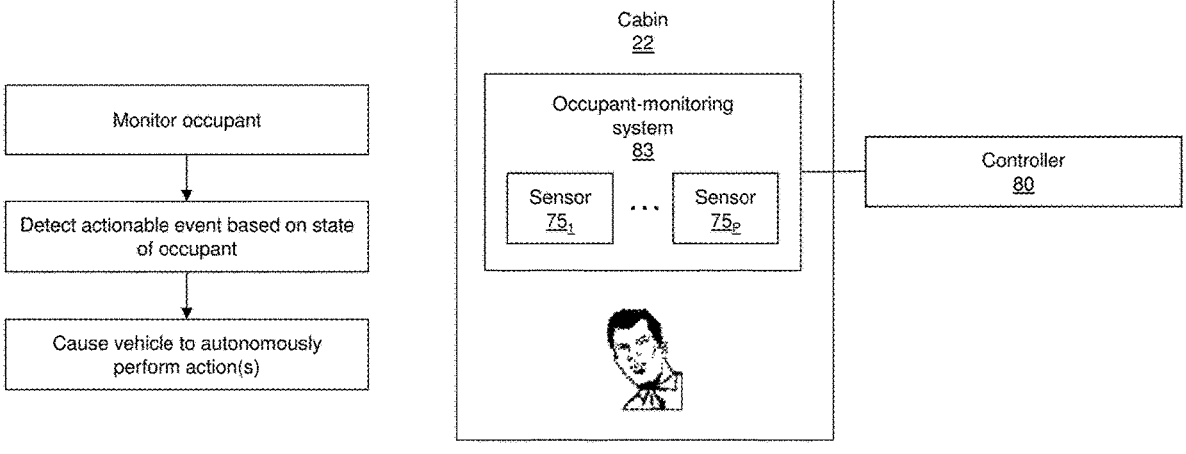
FIGS. 9 and 10 show an embodiment of monitoring an occupant in the cabin of the autonomous vehicle and causing the autonomous vehicle to perform one or more actions in response to detecting an actionable event based on a state of the occupant.

For example, in some embodiments, as shown in FIGS. 9 and 10, the control system 15 may be configured to monitor an occupant in the cabin 22 and cause the vehicle 10 to autonomously perform one or more actions based on a state of the occupant (i.e., what and/or how the occupant is doing).

The controller 80 may process information received or otherwise derived from one or more sensors $75_1$-$75_P$ of an occupant-monitoring system 83 that is monitoring the occupant. For instance, the sensors $75_1$-$75_P$ may be configured to monitor what the occupant is doing, i.e., an activity or a lack of activity of the occupant (e.g., sleeping, eating, working, exercising, watching media, etc.), and/or how the occupant is doing, i.e., a health of the occupant (e.g., whether the occupant appears to be in good condition or suffering a loss of consciousness, a stroke, a heart attack, or other physical impairment).

For example, in some embodiments, the sensors $75_1$-$75_P$ may include a camera to view the occupant (e.g., the occupant's eyes, face, and/or other parts or all of the occupant's body), a motion sensor to sense motion of the occupant, a pressure sensor (e.g., on a given one of the seats $20_1$-$20_S$ that is occupied by the occupant, such as in a headrest or a seat cushion), a vital sign sensor to sense one or more vital signs (e.g., a pulse rate, a respiratory rate, a body temperature, and/or a blood pressure) of the occupant (e.g., a heart rate monitor, a temperature sensor, a blood pressure monitor, etc.), and/or any other sensor. Processing of information received or otherwise derived from the sensors $75_1$-$75_P$ by the controller 80 may comprise image processing (e.g., of images captured by a camera), comparison of parametric values (e.g., to reference or threshold values), and/or any other processing operations.

In some cases, a sensor $75_i$ may be built into the cabin 22 during original manufacturing of the autonomous vehicle 10 (e.g., on a console of the user interface 70, on a given one of the seats $20_1$-$20_S$, etc.). In other cases, a sensor $75_i$ may be installed in the cabin 22 after original manufacturing of the vehicle 10 (e.g., as part of an aftermarket device installed in the cabin 22 by an owner or leaser of the vehicle 10). In yet other cases, a sensor $75_i$ may be carried into the cabin 22 by the occupant as part of a portable device carried by the occupant, such as: a smartphone or other wireless phone; a tablet computer; a head-mounted display, smartwatch or other wearable device; a medical device; etc. In such cases, the portable device comprising the sensor $75_i$ may communicate with the controller 80 via a communication link, which may be wireless, wired, or partly wireless and partly wired (e.g., Bluetooth™, WiFi or other wireless LAN, USB, etc.).

a) Rerouting

Figure 11:
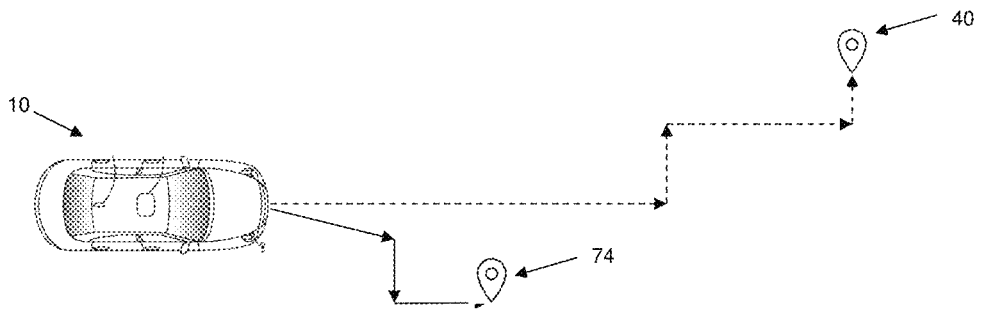
FIG. 11 shows an embodiment of rerouting of the autonomous vehicle.

For example, in some embodiments, as shown in FIG. 11, the controller 80 may monitor an occupant of the vehicle 10 and, in response to detecting an event involving the occupant, reroute the vehicle 10 to a new destination 74 different from an original destination 40 of the vehicle 10.

In some embodiments, the controller 80 may monitor the occupant of the vehicle 10 and, in response to detecting an emergency or other medical event involving the occupant, autonomously reroute the vehicle 10 to the new destination 74 where medical assistance is providable to the occupant (e.g., a hospital, clinic, or other medical establishment; a police station; a fire station; etc.).

More particularly, in some embodiments, based on information regarding vital signs (e.g., heart rate), a position or movement (e.g., a spasm, eyes rolling, a head or upper body tilt or collapse, stillness, a heavy sit, etc.), and/or physical traits (e.g., paleness, bleeding, etc.) of the occupant derived from the sensors $75_1$-$75_P$, the controller 80 may detect one or more conditions indicative of the emergency or other medical event involving the occupant, and may proceed to cause the vehicle 10 to be autonomously rerouted to the new destination 74 where medical assistance can be provided by consulting a database of medical establishments and mapping information using a current location of the vehicle 10.

b) External Notifying

Figure 12:
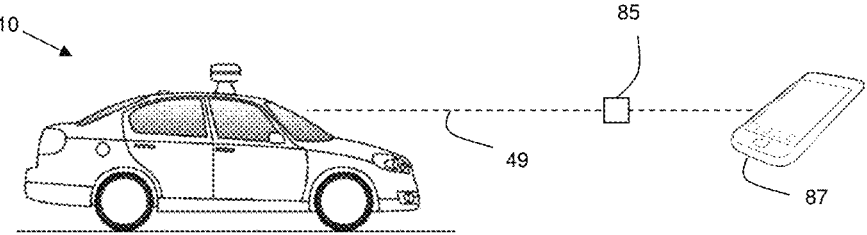
FIG. 12 shows an embodiment of issuing a notification to a communication device external to the autonomous vehicle.

As another example, in some embodiments, as shown in FIG. 12, the controller 80 may monitor an occupant of the vehicle 10 and, in response to detecting an event involving the occupant, cause issuance of a notification 85 to a communication device 87 external to the vehicle 10. The communication device 87 may be a smartphone, a tablet, a head-mounted display, a smartwatch, or other device carried or worn by an individual; a server or other computer; or any other device designed for communication.

For instance, in some embodiments, referring to an example discussed above, the controller 80 may monitor the occupant of the vehicle 10 and, in response to detecting an emergency or other medical event involving the occupant, cause the notification 85 to be transmitted to the communication device 87 which is associated with a medical assistance provider (e.g., at a hospital, clinic, or other medical establishment; a police station; a fire station; etc.) to notify the medical assistance provider of what is happening with the occupant, which may help the medical assistance provider to prepare for treating the occupant. The notification 85 transmitted to the communication device 87 associated with the medical assistance provider may be conveyed as a text message (e.g., SMS message), an email message, a voice message, or any other suitable communication.

The controller 80 may cause the communication interface 68 to transmit the notification 85 to the communication device 87 via a communication link 49 which may be established over a cellular network, a WiFi network, a satellite connection, and/or any other suitable connection.

In some cases, issuance of the notification 85 to the communication device 87 associated with the medical assistance provider may be done in conjunction with autonomous rerouting of the vehicle 10 to a destination where medical assistance is providable to the occupant, as discussed above. In other cases, issuance of the notification 85 to the communication device 87 associated with the medical assistance provider may be done without autonomously rerouting the vehicle 10 to another destination (e.g., the vehicle 10 may be parked, its location may be conveyed to the medical assistance provider, and an ambulance may be dispatched to that location).

c) Responding to Prohibited Behavior

As another example, in some embodiments, the controller 80 may monitor an occupant of the vehicle 10 and, in response to detecting a prohibited behavior exhibited by the occupant, perform one or more actions such as causing the vehicle 10 to autonomously stop (e.g., park) and/or reroute itself and/or causing issuance of a notification 85 to a communication device 87 external to the vehicle 10.

A prohibited behavior is "prohibited" in that it is not allowed to be exhibited in the vehicle 10. This may be specified by a provider of the vehicle 10 (e.g., a manufacturer of the vehicle 10, a taxi, ride-hailing or vehicle-sharing service provider, etc.); a public authority (e.g., a police, a government, etc.); etc. For example, this may include a behavior that is dangerous, hazardous or otherwise risky (e.g., to the occupant, any other occupant of the vehicle 10, or other vehicles on the road 11), is susceptible to vandalize or otherwise damage the vehicle 10, and/or is otherwise undesirable.

For instance, in some embodiments, the controller 80 may monitor the occupant of the vehicle 10 and, in response to detecting a prohibited behavior exhibited by the occupant, autonomously stop (e.g., park) the vehicle 10. The controller 80 may also cause the user interface 70 of the cabin 22 to advise the occupant of the prohibited behavior (e.g., by displaying or otherwise issuing a warning or other notification, which may request the occupant to get out of the vehicle 10, etc.)

Alternatively or additionally, in some embodiments, the controller 80 may cause a notification 85 to be transmitted to a communication device 87 external to the vehicle 10. For instance, the communication device 87 may be associated with a provider of the vehicle 10 or a public authority, and the notification 85 may report the prohibited behavior exhibited by the occupant.

d) Cabin Altering

Figure 13:
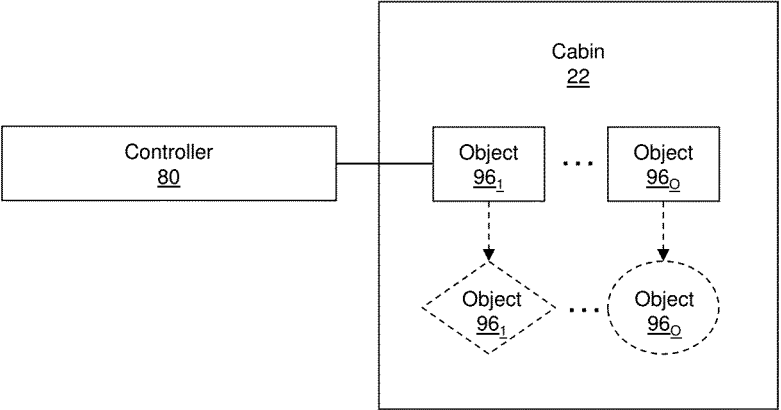

In some embodiments, as shown in FIG. 13, the controller 80 may monitor an occupant of the vehicle 10 and, in response to detecting an event involving the occupant, cause altering of the cabin 22. That is, the controller 80 may cause one or more objects $96_1$-$96_O$ of the cabin 22 to be altered by changing from one state to a different state.

For example, in some embodiments, the controller 80 may monitor the occupant of the vehicle 10 and, in response to detecting that the occupant is sleeping, alter the cabin 22 to facilitate the occupant's sleep.

In some embodiments, the controller 80 may cause the cabin 22 to be altered to reduce stimuli (e.g., light, noise, vibrations, etc.) from the vehicle 10 and/or its environment affecting the occupant who is sleeping.

More particularly, in some embodiments, based on information regarding vital signs (e.g., heart rate), a position or movement (e.g., a head tilt, stillness, etc.), and/or physical traits (e.g., eyes closed, an open mouth, etc.) of the occupant derived from the sensors $75_1$-$75_P$, the controller 80 may detect one or more conditions indicative that the occupant is sleeping, and may proceed to cause the cabin 22 to be altered to reduce stimuli from the vehicle 10 and/or its environment affecting the occupant who is sleeping.

Figure 14:
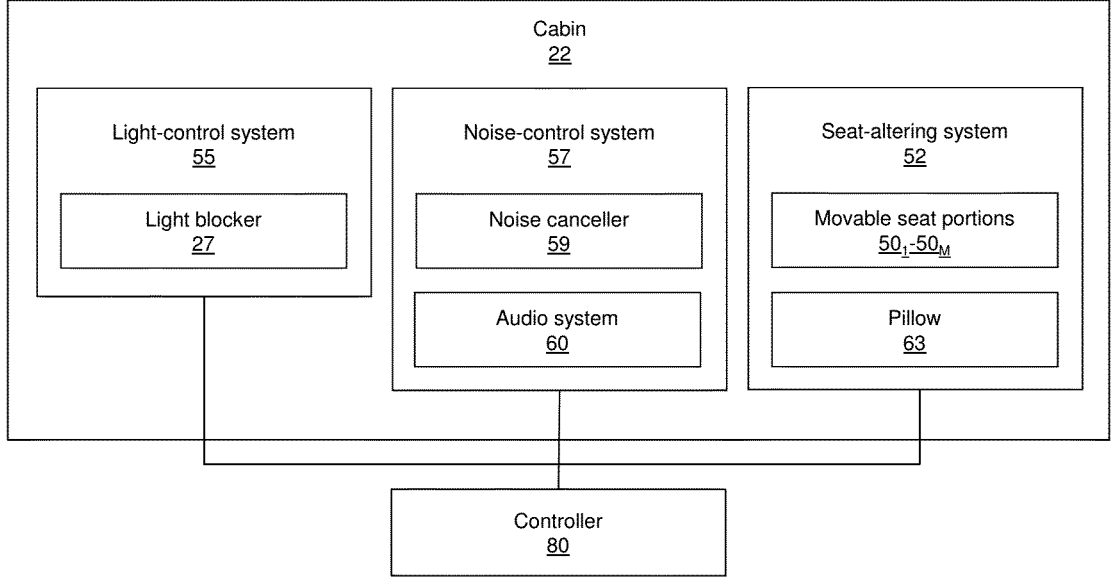
Figures 15, 16:
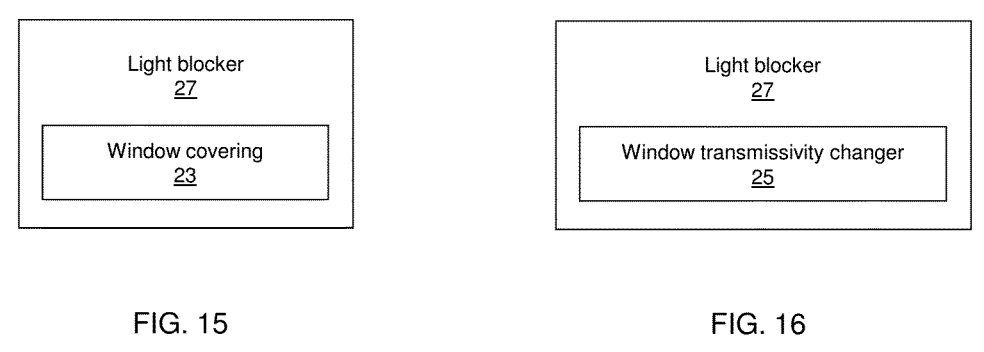

For instance, in some embodiments, as shown in FIG. 14, the cabin 22 may comprise a light-control system 55 to control (e.g., reduce) light entering into the cabin 22 via the windows $21_1$-$21_W$, and the controller 80 may cause the light-control system 55 to reduce the light entering into the cabin 22 upon detecting that the occupant is sleeping. The light-control system 55 may comprise a light blocker 27 activatable by the controller 80 to block light from reaching the interior of the cabin 22 through at least part of the windows $21_1$-$21_W$. As an example, in some embodiments, as shown in FIG. 15, the light-control system 55 may comprise a window covering 23 (e.g., comprising one or more blinds, shades, shutters, and/or curtains) deployable (e.g., extendible) to cover at least part of the windows $21_1$-$21_W$, such that the controller 80 may cause deployment of the window covering 23 to reduce the light entering into the cabin 22. As another example, in some embodiments, as shown in FIG. 16, the light-control system 55 may comprise a window transmissivity changer 25 configured to change a tint or other aspect affecting transmissivity of one or more of the windows $21_1$-$21_W$, and the controller 80 may cause the window transmissivity changer 25 to change the tint or other aspect affecting transmissivity (e.g., darken, increase opacity, etc.) of one or more of the windows $21_1$-$21_W$ to reduce light entering into the cabin 22. For instance, in some embodiments, the window transmissivity changer 25 may comprise a film disposed on one or more of the windows $21_1$-$21_W$ and electrically controllable to alter the tint or other aspect affecting transmissivity (e.g., such as that commercially-available from Smart Tint at www.smarttint.com/).

In some embodiments, the cabin 22 may comprise a noise-control system 57 configured to control (e.g., reduce) noise in the cabin 22, and the controller 80 may cause the noise-control system 57 to reduce noise in the cabin 22 upon detecting that the occupant is sleeping. As an example, in some embodiments, the noise-control system 57 may comprise a noise canceller 59 to at least partly cancel the noise entering the cabin 22, such as by generating sound that at least partly cancels the noise entering the cabin. For instance, the noise canceller 59 may comprise one or more microphones and one or more speakers in the cabin 22, possibly one or more amplifiers or other sound-generating components, and a controller configured to generate an audio signal that is reversed in phase to an audio signal picked up by the one or more microphones and that is applied to the one or more speakers to generate the sound at least partly cancelling the noise entering the cabin 22 (e.g., using active noise control technology for noise cancellation such as that commercially-available from Ford, Toyota, Honda, and other car manufacturers).

Additionally or alternatively, in some embodiments, the controller 80 may cause an audio system 60 of the user interface 70 of the cabin 22 to emit relaxing sound (e.g., ocean waves, rain, forest sounds, soothing music, etc.).

In some embodiments, the controller 80 may cause a seat $20_i$ occupied by the occupant to be altered to facilitate the occupant's sleep. In some cases, the seat $20_i$ may be a "driver's seat" in front of the vehicle 10, in embodiments in which the vehicle 10 is selectively operable either autonomously (i.e., without human control) or under human control (i.e., by a human driver) or where such a driver's seat would conventionally be found in a human-driven vehicle.

For example, in some embodiments, the seat $20_i$ occupied by the occupant may include a seat-altering system 52 configured to alter the seat $20_i$, and the controller 80 may cause the seat-altering system 52 upon detecting that the occupant is sleeping. For instance, in some embodiments, the seat-altering system 52 may comprise one or more actuators (e.g., electromechanical actuators, fluidic (e.g., hydraulic or pneumatic) actuators, etc.) connected to one or more movable portions $50_1$-$50_M$, such as a seating portion, a backrest portion, and a headrest portion, of the seat $20_i$ to change relative positioning of the one or more movable portions $50_1$-$50_M$ of the seat $20_i$. In some cases, the controller 80 may cause the seat-altering system 52 to alter the seat $20_i$ such that the seat $20_i$ is converted into a reclined (e.g., bedlike) configuration in which the occupant is reclined on the seat $20_i$ by repositioning the one or more movable portions $50_1$-$50_M$ of the seat $20_i$.

In some cases, the seat-altering system 52 may comprise a pillow 63 for the seat $20_i$, and the controller 63 may cause the pillow 63 to be deployed upon detecting that the occupant is sleeping. For instance, in some embodiments, the pillow 63 may be integrated into or otherwise associated with the headrest portion of the seat $20_i$ and the controller 80 may cause the pillow 62 to be deployed by moving the pillow 63 to engage the occupant's head (e.g., by activating an actuator to move the pillow 62 into position) and/or by inflating the pillow 63 (e.g., by activating a pump to inflate the pillow 63).

The controller 80 may cause the cabin 22 to be altered in various other ways in other embodiments upon detecting that the occupant is sleeping (e.g., cause a temperature-control system to adjust a temperature in the cabin 22, activate a vibration system of the seat 20_i, etc.).

e) Self-Driving Mode Altering

Figure 17:
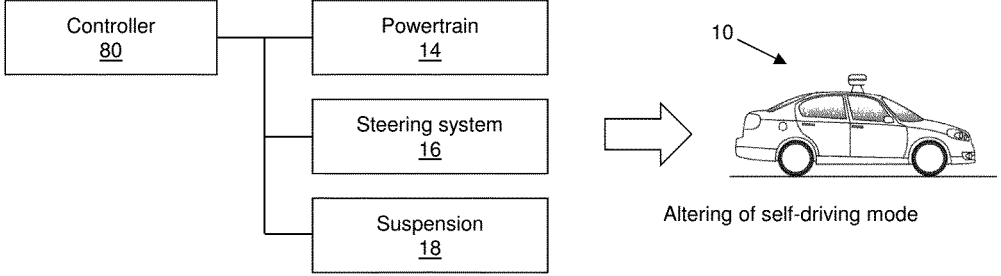
FIG. 17 shows an embodiment of altering a self-driving mode of the autonomous vehicle.

In some embodiments, as shown in FIG. 17, the controller 80 may monitor an occupant of the vehicle 10 and, in response to detecting an event involving the occupant, alter a self-driving mode of the vehicle 10, i.e., alter how the vehicle 10 autonomously drives itself.

For example, in some embodiments, referring to an example discussed above, the controller 80 may monitor the occupant of the vehicle 10 and, in response to detecting that the occupant is sleeping, alter the self-driving mode of the vehicle 10 to facilitate the occupant's sleep, such as by reducing potential for sudden or abrupt movements (e.g., acceleration, braking, turning, shaking, etc.) of the vehicle 10 on the road 11.

In some embodiments, the controller 80 may control the powertrain 14, the steering system 16, the suspension 18, and/or possibly other devices of the vehicle 10 so that the self-driving mode of the vehicle 10 is smoother than when the occupant is deemed to be awake. For instance, the controller 80 may control the powertrain 14 (e.g., by controlling an ECU, TCU or other powertrain control unit) so that the vehicle 10 accelerates and/or decelerates (e.g., breaks) less intensely, control the steering system 16 so that the vehicle 10 turns less sharply, and/or control the suspension 18 (e.g., by controlling an active suspension system of the suspension 18) so that it is less stiff than when the occupant is deemed to be awake.

Additionally or alternatively, in some embodiments, the controller 80 may reroute the vehicle 10 to its destination along a new route that is different from and more suited to sleep of the occupant than its original route. For instance, the new route may include fewer stops (e.g., stop signs, traffic lights, etc.), fewer and/or less sharp turns, a smoother roadway (e.g., less damaged or flatter roadway) than the original route. The controller 80 may consult mapping information to determine the new route based on a current location of the vehicle 10.

In some embodiments, when the occupant is sleeping, the controller 80 may cause one or more actions to be performed in the cabin 22 to awaken the occupant. For example, in some embodiments, the controller 80 may cause the user interface 70 to issue an awakening notification, such as by causing the user interface 70 to emit sound (e.g., an alarm, music, etc.), vibrate the seat 20_i of the occupant, and/or otherwise stimulate the occupant to awaken him/her. Also, in some embodiments, the controller 80 may cause the light-control system 55 to let more light into the cabin 22 via the windows 21_1-21_W (e.g., by retracting the window covering 23, causing the window transmissivity changer 25 to change lighten the tint or otherwise increase transmissivity of light through one or more of the windows 21_1-21_W), the noise-control system 57 to let more noise in the cabin 22 (e.g., by stopping noise cancellation), the seat-alteration system 52 to move the seat 20_i back into a seated configuration and/or retract the pillow 63, etc.

In some cases, the controller 80 may cause one or more actions to be performed in the cabin 22 to awaken the occupant based on a current location of the vehicle 10 and/or a current time. For instance, the controller 80 may cause these one or more actions to be performed upon determining based on the current location of the vehicle 10 and/or the current time relative to the destination of the vehicle 10. When it determines that the vehicle 10 is sufficiently close to its destination and/or will arrive at its destination sufficiently soon, the controller 80 proceeds to cause these one or more actions to be performed to awaken the occupant.

Figure 18:
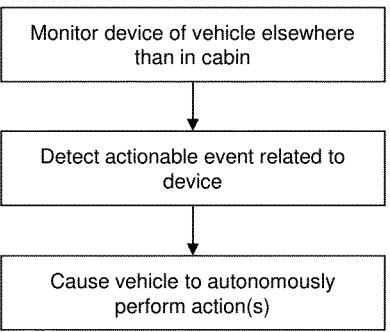
FIG. 18 shows an embodiment of monitoring a device of the autonomous vehicle elsewhere than at the cabin of the autonomous vehicle and causing the autonomous vehicle to perform one or more actions in response to detecting an actionable event related to the device.

In other embodiments, as shown in FIG. 18, the control system 15 of the autonomous vehicle 10 may be configured to cause the vehicle 10 to autonomously reroute itself and/or perform one or more other actions based on a state of a device (e.g., of the powertrain 14, the steering system 16, or the suspension 18) of the vehicle 10 elsewhere than in the cabin 22, etc.

For example, in some embodiments, the control system 15 may be configured to monitor an energy level (e.g., a battery level or a fuel level) of the powertrain 14 (e.g., a battery and/or a fuel tank of the powertrain 14) and, in response to detecting that the energy level reaches a threshold, cause the vehicle 10 to autonomously reroute itself to an energy-replenishing station (e.g., a charging station for a battery for an electric motor and/or a fueling station for a fuel tank for an internal combustion engine).

As another example, in some embodiments, the control system 15 may be configured to monitor an operability of a device (e.g., of the powertrain 14, the steering system 16, or the suspension 18) and, in response to detecting that the operability of the device is unsuitable for the vehicle 10 (e.g., the device is defective or worn to a threshold), cause the vehicle 10 to autonomously reroute itself to a repair station.

Figure 19:
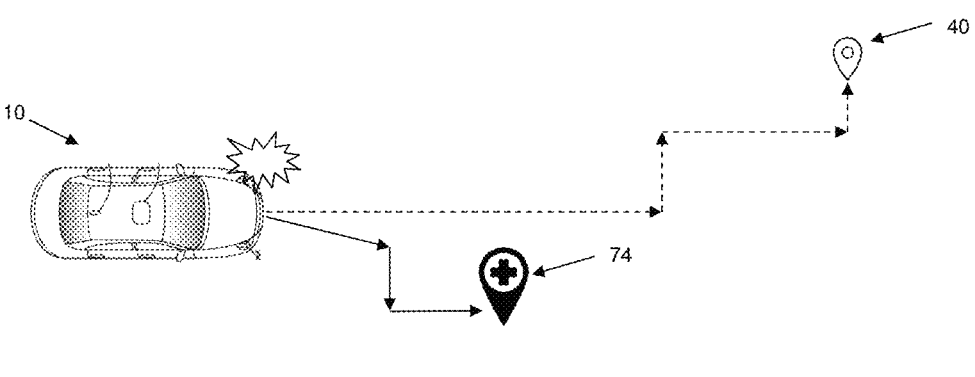
FIG. 19 shows another embodiment of rerouting of the autonomous vehicle.

In some embodiments, as shown in FIG. 19, the controller 80 may monitor the vehicle 10 and, in response to detecting an accident (e.g., a crash), reroute the vehicle 10 to a new destination 74 different from an original destination 40 of the vehicle 10 if the vehicle 10 remains operable. For example, if one or more occupants are in the vehicle 10 when the accident occurs, the controller 80 may autonomously reroute the vehicle 10 to the new destination 74 where medical assistance is providable to the one or more occupants (e.g., a hospital, clinic, or other medical establishment; a police station; a fire station; etc.). This may be done by consulting a database of medical establishments and mapping information using a current location of the vehicle 10. The controller 80 may detect the accident based on a sensor (e.g., a crash sensor) or deployment of an airbag in the cabin 20.

Figure 20:
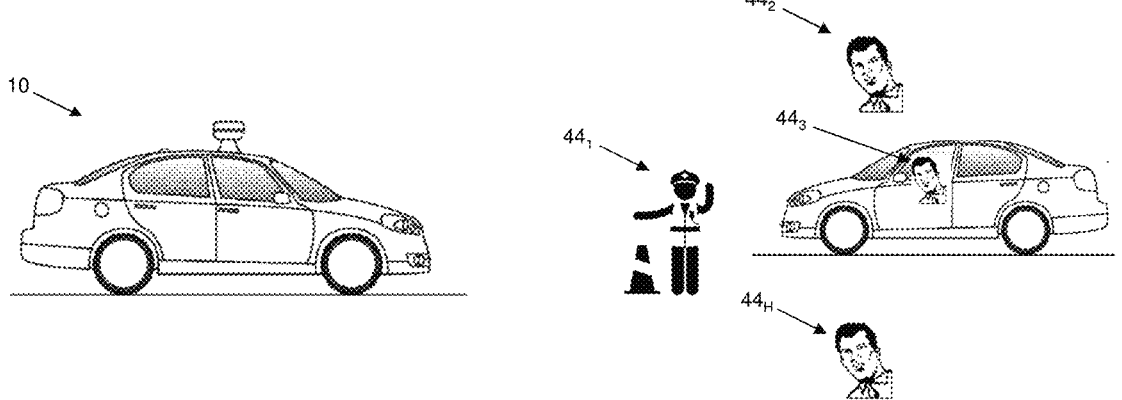
FIGS. 20 and 21 show an embodiment of the autonomous vehicle acting based on interactions with (e.g., gestures of) humans external to the autonomous vehicle.

2. Autonomously Acting Based on Interactions With (e.g., Gestures of) Humans External to Vehicle In some embodiments, as shown in FIG. 20, the control system 15 of the autonomous vehicle 10 may be configured to cause the vehicle 10 to autonomously perform one or more actions based on one or more interactions with humans 44_1-44_H (e.g., police officers, school-crossing guards, traffic guards at roadwork or other temporary traffic control sites, drivers of other vehicles, etc.) external to the vehicle 10.

For example, in this embodiment, the control system 15 may be configured to detect a "human protocol gesture" being made by a human 44_i outside the vehicle 10 and to alter a manner in which the vehicle 10 drives itself based on that detected gesture. A human protocol gesture refers to gestures, made by humans in positions of traffic controlling authority, that embed one or more commands for overriding or contradicting conventional algorithmic driving rules. For instance, a human protocol gesture may be made by hands of a police officer to wave traffic into a lane of opposing traffic, or by a hand and stop sign of a school-crossing guard to stop traffic when there is no actual stop sign, or by a driver of an oncoming vehicle flashing his or her vehicle's lights in the spirit of agreeing on who will have priority when crossing a narrow stretch of road such as a one-lane bridge. Commands embedded in a human protocol gesture could include one command or a series of commands. An example of a command could be "stop". An example of a series of commands could be "change into oncoming traffic lane, advance, and return to original lane after a safe distance".

Other examples of human protocol gestures include motorcycle hand as described in: signals www.motorcyclel-egalfoundation.com/motorcycle-hand-signals-chart/. However, it should be appreciated that a human protocol gesture is not limited to being derived from hand movements.

If the vehicle 10 were not an autonomous vehicle, and instead were a conventional vehicle controlled by a human driver, the human protocol gestures being discussed here would be destined for the driver of such vehicle, and there is an expectation on the part of the person making the human protocol gesture that the driver inside the vehicle will understand the gesture and will make resultant modifications to control of the vehicle. This expectation is created as part of the driving culture that has developed in North America and, similarly, in other parts of the world. For example, the United Kingdom uses the "signals by authorized persons", found at: assets.publishing.service.gov.uk/media/560aa62bed915d035c00001b/the-highway-code-signals-by-authorised-persons.pdf.

Figure 21:
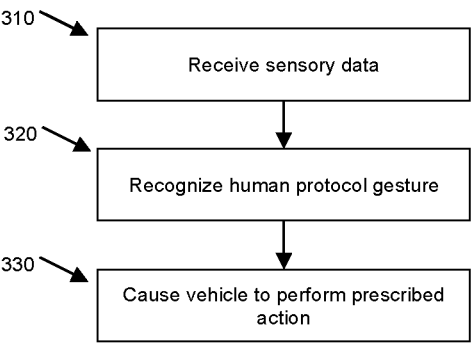

As the vehicle 10 is an autonomous one, and with reference to FIG. 21, human protocol gesture detection is a result of receiving sensory data at step 310 (e.g., from the sensors $90_1$-$90_S$ such as cameras or LIDAR) and implementing an algorithm, by the controller 80 at step 320, to recognize a human protocol gesture that may (or may not) be present in the received sensory data. Various gesture recognition algorithms may be used for this purpose. In the event a human protocol gesture is recognized at step 320 (i.e., the commands embedded therein have been decoded), a prescribed action can then be taken at step 330, involving a change to the manner in which the vehicle 10 is autonomously driven. A mapping between human protocol gestures and prescribed driving actions can be stored in the memory portion 168, such as in a database, of the controller 80.

a) Human Protocol Gesture Recognition

For example, consider a human protocol gesture made by a police officer to control traffic in both directions where there is only one lane, e.g., as a result of an accident. This could involve the police officer using one hand to stop traffic in one direction and the other hand to beckon traffic in the other direction. It is clear that, at some point, the police officer will allow one of the directions of traffic flow to drive along a stretch of road in the opposite direction of what would be permitted under conventional algorithmic driving rules.

In order to detect and recognize the human protocol gesture, an algorithm may be used (step 320), which includes recognizing hand and arm movements in images captured in the vicinity of the vehicle 10 (step 310). The recognized hand and arm movements may be correlated against a database of sequences of pre-determined hand and arm movements associated with different human protocol gestures. Various distance minimization algorithms used in pattern recognition can be used for the purposes of recognizing hand and arm movements to with a certain level of confidence.

Although hand gesture recognition technology is commercially available (see, for example, www.arcsoft.com/technology/gesture.html), it is envisaged that the person making the hand gesture (e.g., police officer or crossing guard) may be oriented in such a way where the space defined by the movements of his or her two hands intersects to a point where it may be difficult to detect hand or arm movements without additional spatial registration or reference. To assist in this regard, the person executing the human protocol gesture may be provided with ancillary equipment, such as a stop sign or baton, which can be more easily detected by the sensors 901-90S and used as a reference to allow more accurate detection of the hand and arm movements and hence the human protocol gesture.

Figure 22:
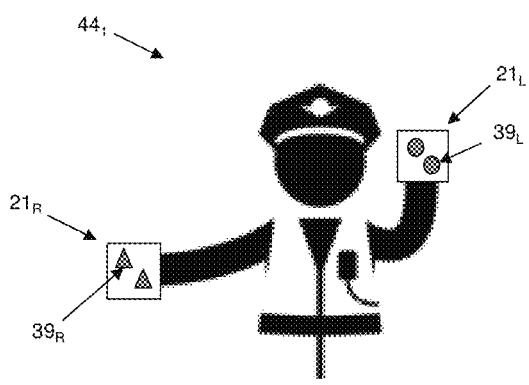
FIG. 22 shows an embodiment of a human external to the autonomous vehicle having equipment detectable by the autonomous vehicle to facilitate recognition of gestures.

In another embodiment, as shown in FIG. 22, the ancillary equipment may include gloves $21_L$, $21_R$ worn by the police officer or crossing guard $44_i$. Such gloves may be coated by, covered with or otherwise include retroreflective material $39_L$, $39_R$. Such material facilitates detection from a direction that shines light onto the material. Moreover, the left and right gloves $21_L$, $21_R$ may have differences between them so as to provide a more easily identifiable hand and arm movements. Such differences could be differences in color, contrast, material patterns (including different patterns of retroreflective material). Stated differently, the left and right gloves $21_L$, $21_R$ are non-symmetric in their distribution of retroreflective material. In this way, the control system 15 is provided with two locatable references when processing the data obtained via the sensors $90_1$-$90_S$, which could increase accuracy of detecting the hand and arm movements, with a corresponding increase in accuracy of recognizing the human protocol gesture underlying such hand movements.

Consider now the situation where the human protocol gesture involves actions of a driver of an oncoming vehicle where, for example, a single lane must be shared between the vehicle 10 and the oncoming vehicle. In this case, the sensors $90_1$-$90_S$, capture images of the driver of the oncoming vehicle, who may be gesturing with his or her hands. Alternatively or in addition, the driver of the oncoming vehicle may also have triggered a detectable change to the oncoming vehicle, such as by temporarily flashing the head lights or the high beam to signal a desire to relinquish right-of-way to the vehicle 10 (not necessarily knowing a priori that the vehicle 10 is an autonomous vehicle). These effects (hand gestures and/or flashing headlights), in combination, can be detected and processed by the control system 15 so as to result in a conclusion that the driver of the oncoming vehicle has carried out a human protocol gesture, which embeds a command (such as "go ahead").

b) Driving Behavior Modifications Based on Human Protocol Gesture

Once a human protocol gesture has been detected, and recognized, the control system 15 has effectively decoded a command (or sequence of commands) issued by the human $44_i$ involved in making the gesture, according to cultural norms. It is envisaged that this command, if acted upon by the vehicle 10, would be inconsistent with conventional algorithmic driving rules and therefore the control system 15 may cause the vehicle 10 to change modes of operation. For example, the control system 15 may cause the vehicle 10 to enter a conventional (non-self-driving) mode, whereby control of the vehicle 10 is passed to a human that is occupying a driver's seat of the vehicle 10. In another embodiment, the control system 15 may enter an "autonomous override" mode of operation whereby the vehicle 10 is still in self-driving mode but behaves in a way that deviates from conventional algorithmic driving rules.

The override mode of operation may be temporary, as it is expected that driving conditions will return to normal. As such, each human protocol gesture may be associated with an expected length of time that the vehicle 10 will remain in the override mode. This amount of time may be variable, depending on the speed with which traffic is moving, the distance to the human $44_i$ carrying out the human protocol gesture, etc. Once the expected amount of time is reached, it is envisaged that there will no longer be any gesturing directed at the vehicle 10 and the control system 15 will have to determine autonomously the moment when it is should return to a normal autonomous mode of operation (consistent with conventional algorithmic driving rules).

For example, a police officer or crossing guard $44_i$ may have carried out a human protocol gesture that signals for the vehicle 10 to stop, despite the vehicle 10 having right-of-way under conventional algorithmic driving rules. In this case, the vehicle 10 enters the override mode. During the override mode, the control system 15 modifies the way in which the vehicle 10 is autonomously driven by (i) keeping the vehicle 10 stopped and (ii) continuing the detection of human protocol gestures until detecting that the vehicle 10 has been signaled to proceed. If the control system 15 detects a subsequent human protocol gesture that includes a command for the vehicle 10 to change lanes into an oncoming traffic lane, then modifying the way in which the vehicle 10 is autonomously driven includes proceeding at low speed into the oncoming traffic lane (which is contrary to conventional algorithmic driving rules), determining a re-entry point into the regular lane and re-entering the regular lane at the re-entry point. Thereafter, the vehicle 10 exits the override mode.

Another way to condition the vehicle 10 to exit the override mode may be to learn about its surroundings (e.g., using the sensors $90_1$-$90_S$). For example, the control system 15 may implement an accident detection module that is configured to detect a scene of an accident based on factors such as vehicle shape and position distortions, color anomalies, broken glass fragments on the ground, presence of ambulances and so on. In this case, the control system 15 may be configured to determine a safe distance from the scene of the accident after which the vehicle 10 may return to its original lane and exit the override mode.

c) Validation

Figure 23:
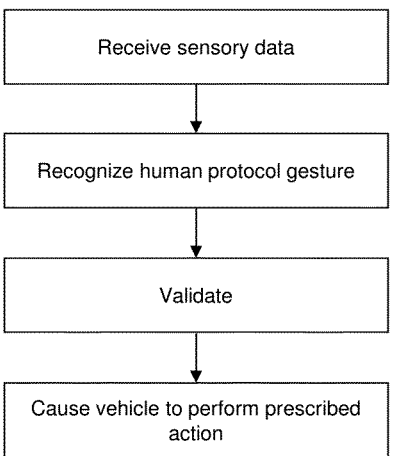
FIG. 23 shows a variant to what is shown in FIGS. 20 and 21.

In addition to detecting and recognizing a human protocol gesture, in some embodiments, as shown in FIG. 23, the control system 15 may perform an additional validation step, in order to confirm the authority of the source of the human protocol gesture, before proceeding to alter driving behavior. In that sense, the control system 15 may perform the validation step based on detection of a uniform (e.g., in the case of a police officer or crossing guard, whereby the uniform could include one or more of a vest, hat, badge, pants and shoes) or based on detection of a human driver of an oncoming car, as well as detecting "eye contact" with that human driver.

In the case where the human $44_i$ carrying out the hand and arm movements associated with a human protocol gesture uses the gloves $21_L$, $21_R$, it is conceivable to detect codes or patterns in the retroreflective material $39_L$, $39_R$ of those gloves that would be unknown to the general public yet associated uniquely with authorized users. As such, it would add confidence to the control system 15 that it can act upon a human protocol gesture detected as having been carried out by a wearer of such "authenticated" gloves.

It is also envisaged that the gloves $21_L$, $21_R$ worn by police officers or crossing guards may lead to new gestures targeted specifically at autonomous vehicles such as the vehicle 10. Such gestures could involve hand and arm movements that would not be intuitively understood by human drivers yet ideally suited for detection by cameras and/or LIDAR. For example, certain newly created movements, positions or signs may serve to cancel or reset the control system's interpretation of any ongoing human protocol gesture so as to allow the human to restart communications using hand and arm movements.

It is also envisaged that the hand and arm movements may be recorded in memory and post-processed for algorithm improvement.

3. Autonomously Acting Based on Indicators Placed at Particular Locations

Figure 34:
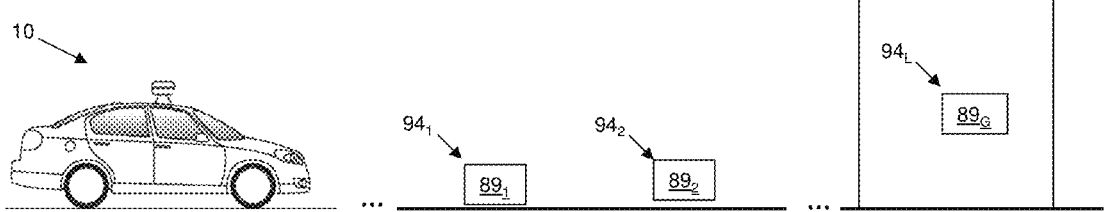

In some embodiments, as shown in FIG. 34, indicators $89_1$-$89_G$ may be configured to be placed at particular locations $94_1$-$94_L$ and recognizable by the control system 15 of the vehicle 10 such that the control system 15 autonomously operates the vehicle 10 (e.g., steers, decelerates, stops, opens one or more of the windows $21_1$-$21_W$, unlocks one or more doors of the cabin 22, etc.) at these particular locations based on recognition of the indicators $89_1$-$89_G$.

The indicators $89_1$-$89_G$ can provide information about the particular locations $94_1$-$94_L$ to the control system 15 of the vehicle 10 that may otherwise be unobtainable by the control system 15 through its sensing apparatus 82 monitoring the environment of the vehicle 10 if the indicators $89_1$-$89_G$ were absent from that environment.

For example, in various embodiments, this may be useful when the vehicle 10 moves at drive-through establishments (e.g., restaurants, banks, etc.), travels where potholes are present, looks to park, and/or is in other situations in which certain aspects of the particular locations $94_1$-$94_L$ would otherwise not be timely known by the control system 15 of the vehicle 10.

An indicator $89_x$ is a physical object dedicated to autonomous vehicles like the vehicle 10 and designed to be placed at a particular location $94_y$ and recognized by the autonomous vehicles' control systems like the control system 15 of the vehicle 10 to cause these control systems to operate the autonomous vehicles based on recognition of the indicator $89_x$. That is, the control system 15 of the vehicle 10 operates the vehicle 10 differently when recognizing the indicator $89_x$ than if it had not recognized the indicator $89_x$. The indicator $89_x$ has an associated predefined meaning such that, upon being recognized by the control system 15 of the vehicle 10, the control system 15 knows what the indicator $89_x$ means. Dedicated to autonomous vehicles, the indicator $89_x$ is not a traffic sign (a.k.a., road sign) conventionally used for human-driven vehicles.

The indicator $89_x$ at the particular location $94_y$ may be implemented in any suitable way in various embodiments.

Figures 35, 36:
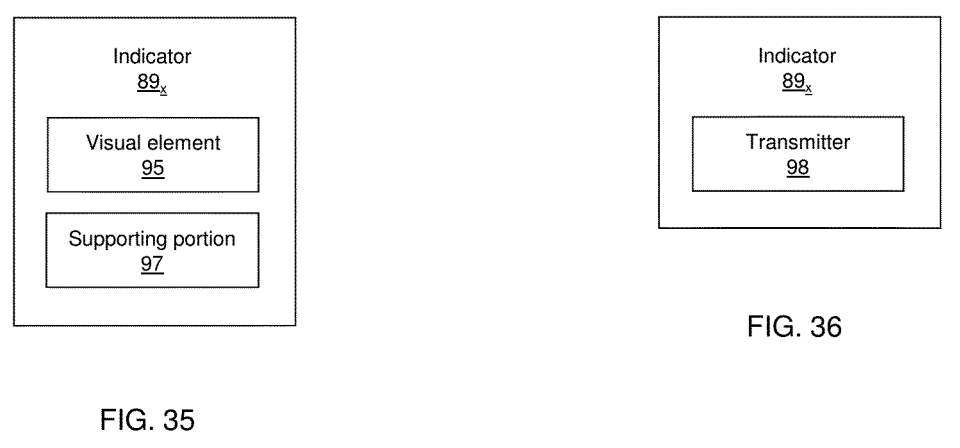

For example, in some embodiments, as shown in FIG. 35, the indicator $89_x$ may be an optical indicator configured to be optically observed by the sensing apparatus 82 of the control system 15 of the vehicle 10. For instance, in some embodiments, the indicator $89_x$ may include a visual element 95 such as an image (e.g., a symbol, etc.), a color, etc., capturable by a camera of the sensing apparatus 82 and recognizable by the controller 80 of the control system 15. The visual element 95 may be printed, painted or otherwise applied. In some cases, the indicator $89_x$ may comprise a supporting portion 97 (e.g., a wall, panel, etc.) and the visual element 95 may include a layer that is printed, painted or otherwise applied onto the supporting portion 97. In other cases, the visual element 95 may be printed, painted or otherwise applied directly onto an existing structure (e.g., part of the road 11, a building wall, etc.) at the particular location $94_y$. The visual element 95 may include material (e.g., tape, paint, ink, etc.) more easily observable by the camera of the sensing apparatus 82, such as by being more reflective (e.g., highly retroreflective, reflective of IR or other particular wavelengths, etc.)

As another example, in some embodiments, as shown in FIG. 36, the indicator $89_x$ may be a signal emitter (e.g., a beacon) configured to emit a signal receivable by the communication interface 68 of the vehicle 10 and recognizable by the controller 80 of the control system 15. For instance, in some embodiments, the indicator $89_x$ may include a transmitter 98 configured to transmit the signal repeatedly (e.g., periodically) or in response to a trigger or interrogation signal previously issued by the vehicle 10. The signal emitted by the indicator $89_x$ may be wirelessly conveyed via a cellular, WiFi, Blue Tooth, or other wireless link.

Figure 37:

For instance, in some embodiments, as shown in FIG. 37, an indicator $89_x$ may be placed at a particular location $94_y$ where an interaction with an external element 106 that is external to the vehicle 10 is to occur, such that the control system 15 of the vehicle 10 autonomously stops the vehicle 10 at the particular location $94_y$ in order to allow occurrence of the interaction with the external element 106. More particularly, in this embodiment, the particular location $94_y$ is at a drive-through establishment 108, such as a restaurant (e.g., a fast-food restaurant, a coffee shop, etc.) in which case the external element 106 is a drive-through counter to pay and/or pick up an order of food and/or beverage or a bank in which case the external element 106 is an automated telling machine (ATM) to perform a financial transaction. Upon recognizing the indicator $89_x$, the control system 15 of the vehicle 10 understands that the vehicle 10 is to be stopped at the particular location $94_y$, which may be set so that a given one of the windows $21_1$-$21_W$ of the cabin 22 is aligned with the drive-through counter, ATM or other external element 106 to proceed with the interaction with the external element 106.

Figure 38:
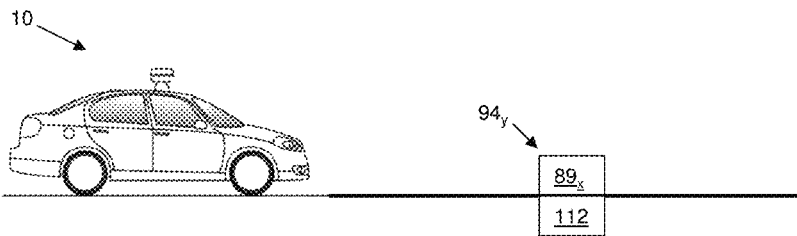

In some embodiments, as shown in FIG. 38, an indicator $89_x$ may be placed at a particular location $94_y$ that should be avoided by the vehicle 10, such that the control system 15 of the vehicle 10 autonomously steers the vehicle 10 to avoid the particular location $94_y$. More particularly, in this embodiment, the particular location $94_y$ is at a pothole 112 on the road 11. Upon recognizing the indicator $89_x$, the control system 15 of the vehicle 10 understands that the vehicle 10 is to avoid the pothole 112 at the particular location $94_y$ and determine an alternative path to steer the vehicle 10 without crossing the pothole 112 (e.g., by using the sensing apparatus 92 to assess whether there is an incoming vehicle in an adjacent lane, etc.).

Figure 39:

In some embodiments, as shown in FIG. 39, an indicator $89_x$ may be placed at a particular location $94_y$ that is a parking spot 118 for the vehicle 10, such that the control system 15 of the vehicle 10 autonomously parks the vehicle 10 at the parking spot 118. More particularly, in this embodiment, the parking spot 118 at the particular location $94_y$ may not be indicated by conventional paint on the road 11 or other conventional parking signs, so that it may not be apparent to the control system 15 of the vehicle 10 that the vehicle 10 can park there. Upon recognizing the indicator $89_x$, the control system 15 of the vehicle 10 understands that the vehicle 10 can park at the parking spot 118 at the particular location $94_y$ and proceeds to autonomously park the vehicle 10 there (e.g., by using the indicator $89_x$ as a reference for parking, such as a center, corner or other reference point of the parking spot 118).

4. Facilitating Acts of Occupants (e.g., Unrelated to and Normally Not Done While Driving)

Figure 24:
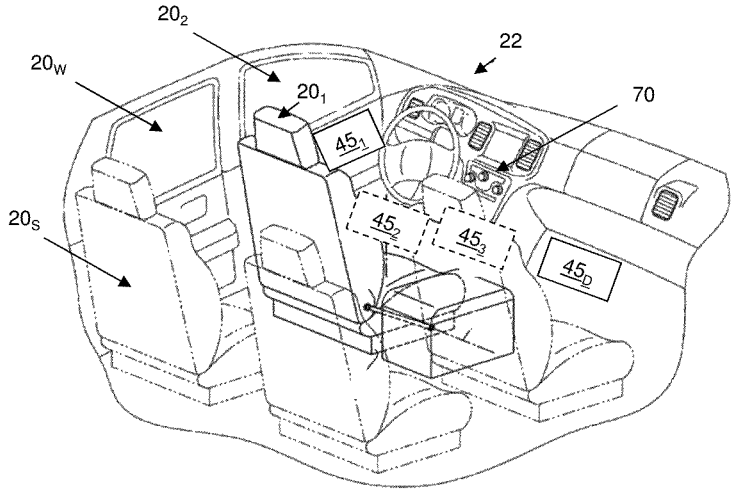
FIGS. 24 to 31 show embodiments of occupant-act facilitators of the autonomous vehicle to facilitate acts of occupants in the cabin of the autonomous vehicle, such as sleeping, exercising, working, eating, cooking, and/or any other suitable act.

In some embodiments, as shown in FIG. 24, the autonomous vehicle 10 may include occupant-act facilitators $45_1$-$45_D$ that comprise devices configured to facilitate one or more acts of one or more occupants in the cabin 22 of the vehicle 10, such as one or more acts unrelated to and normally not done while driving, including, for example, sleeping, exercising, working, eating, cooking, and/or any other suitable act.

a) Sleeping

Figure 25:
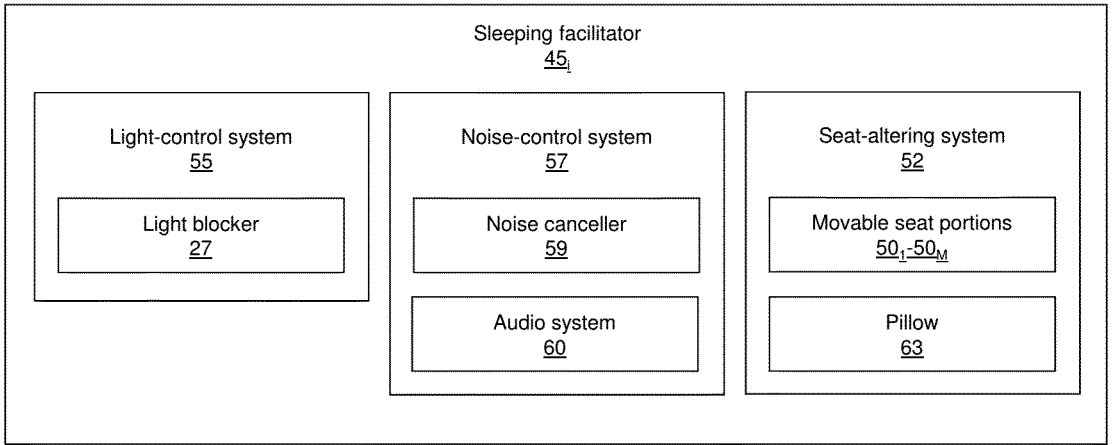

In some embodiments, as shown in FIG. 25, an occupant-act facilitator $45_i$ may be a sleeping facilitator configured to facilitate sleeping of an occupant in the cabin 22, such as by altering the cabin 22 to reduce stimuli (e.g., light, noise, vibrations, etc.) from the vehicle 10 and/or its environment.

For example, in some embodiments, the sleeping facilitator $45_i$ may comprise the light-control system 55 to control (e.g., reduce) light entering into the cabin 22 via the windows $21_1$-$21_W$, which may comprise the light blocker 27, such as the window covering 23 deployable to cover at least part of the windows $21_1$-$21_W$ and/or the window transmissivity changer 25 (e.g., film) to change the tint or other aspect affecting transmissivity of one or more of the windows $21_1$-$21_W$, as discussed above. As another example, in some embodiments, the sleeping facilitator $45_i$ may comprise the noise-control system 57 configured to control (e.g., reduce) noise in the cabin 22, which may comprise the noise canceller 59 to at least partly cancel the noise entering the cabin 22, as discussed above. As yet another example, in some embodiments, the sleeping facilitator $45_i$ may comprise the seat-altering system 52 configured to alter a seat $20_i$ (e.g., a driver's seat) occupied by the occupant, which may comprise the pillow 63 for the seat $20_i$, as discussed above.

In some embodiments, instead of being controlled by the controller 80, the sleeping facilitator $45_i$ may be manually operated within the cabin 22 by an occupant. For example, in some embodiments, the occupant may interact with the user interface 70 to input commands to activate, move, and/or otherwise control the sleeping facilitator $45_i$ when he/she desires to sleep.

In some examples, one or more functionalities of the sleeping facilitator $45_i$ that enhance privacy and comfort as discussed above may also be used by the occupant for purposes other than sleep. For instance, in some embodiments, this may be used by the occupant for relaxing (without necessarily sleeping), sex, etc.

b) Working

Figure 26:
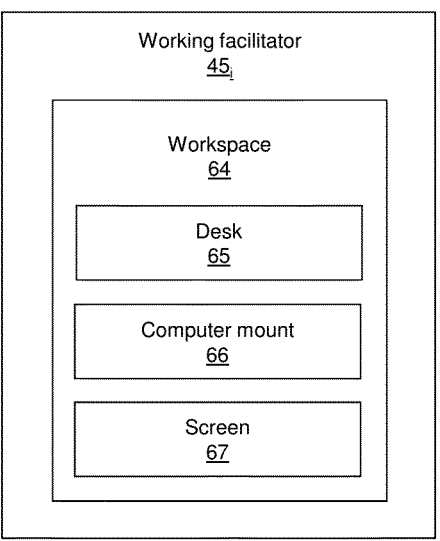

In some embodiments, as shown in FIG. 26, an occupant-act facilitator $45_j$ may be a working facilitator configured to facilitate work of an occupant in the cabin 22 by (e.g., altering the cabin 22 for) providing a workspace 64 for the occupant.

For example, in some embodiments, the working facilitator $45_i$ providing the workspace 64 may comprise a desk 65 (e.g., a table) on which the occupant can work, such as by supporting a computer (e.g., a laptop computer, a tablet, etc.), papers, pens, and/or other work items used by the occupant. In some cases, the working facilitator $45_i$ may include a computer mount 66, such as a docking station and/or connectors (e.g., one or more power outlets or other electrical connectors, USB connectors, etc.) associated with the desk 65. The working facilitator $45_i$ may also include a screen 67 connectable to the computer (e.g., via the computer mount 66) and integrated into the cabin 22 (e.g., in a dashboard, such as part of the user interface 70).

In some embodiments, at least part of the working facilitator $45_i$ providing the workspace 64 may be movable between a working position, in which it is usable by the occupant to work, and a nonworking (e.g., stowed) position, in which it is stowed (e.g., stored), concealed and/or otherwise not usable by the occupant to work. For example, in some embodiments, at least part of the working facilitator $45_i$ providing the workspace 64 may be deployable (e.g., extendible) from the nonworking position into the working position and retractable from the working position into the nonworking position (e.g., in which it may be concealed by a door).

For instance, in some embodiments, the desk 65 may be movable between the working position, in which it extends over the occupant while he/she is sitting on a seat $20_i$ so as to be usable by the occupant to work on the desk 65, and the nonworking position, in which it clears (i.e., does not extend over) the occupant while he/she is sitting on the seat $20_i$ so that the occupant is unimpeded by the desk 65. Alternatively, in some embodiments, the desk 65 may be movable between the working position, in which it extends over an adjacent one of the seats $20_1$-$20_w$ (e.g., a passenger seat) that is adjacent to the seat $20_i$ of the occupant that can be rotated to face the desk 65, and the nonworking position, in which it clears (i.e., does not extend over) that adjacent seat. For example, in some embodiments, the desk 65 may be deployable (e.g., extendible) from the nonworking position, in which it is disposed in a recess (e.g., between adjacent ones of the seats $20_1$-$20_S$, below a dashboard of the user interface 70, etc.) into the working position over the occupant in the seat $20_i$ and retractable from the working position into the nonworking position. In cases where the workspace 64 includes the screen 67 for the computer, the screen 67 may also be movable (e.g., deployable and retractable) between the working position and the nonworking position.

c) Exercising

Figure 27:
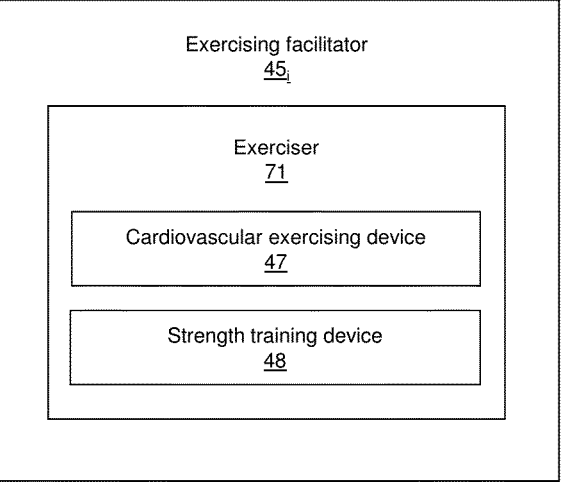

In some embodiments, as shown in FIG. 27, an occupant-act facilitator $45_k$ may be an exercising facilitator configured to facilitate exercising of an occupant in the cabin 22 by (e.g., altering the cabin 22 for) providing an exerciser 71 for the occupant. The exerciser 71 can comprise any apparatus usable by the occupant to physically exercise.

For example, in some embodiments, the exerciser 71 may comprise a cardiovascular exercising device 47. For instance, in some cases, the cardiovascular exercising device 47 may comprise a leg-motion mechanism configured to be operated by legs of the occupant (e.g., including pedals, gliders, and/or other feet-engaging elements configured to be engaged by the occupant's feet to operate the leg-motion mechanism, in a pedaling, swinging, or any other suitable movement). Alternatively or additionally, the cardiovascular exercising device 47 may comprise an arm-motion mechanism configured to be operated by arms of the occupant (e.g., including handles and/or other hand-engaging elements configured to be engaged by the occupant's hands to operate the arm-motion mechanism, in a rowing, pulling or any other suitable movement). In some cases, the cardiovascular exercising device 47 may comprise both the leg-motion mechanism and the arm-motion mechanism configured to be operated by the occupant's legs and arms (e.g., akin to an elliptical exercising machine).

As another example, in some embodiments, the exerciser 71 may comprise a strength training device 48. For instance, in some cases, the strength training device 48 may comprise an arm-motion mechanism configured to be operated by the occupant's arms (e.g., including handles and/or other hand-engaging elements configured to be engaged by the occupant's hands to operate the arm-motion mechanism, in a bending, pulling or any other suitable movement). Additionally or alternatively, in some cases, the strength training device 48 may comprise a leg-motion mechanism configured to be operated by the occupant's legs (e.g., including pedals, gliders, and/or other feet-engaging elements configured to be engaged by the occupant's feet to operate the leg-motion mechanism, in a pushing, raising, and/or any other suitable movement).

The exerciser 71 may provide resistance for exercising of the occupant in any suitable way. For example, in some embodiments, the exerciser 71 may comprise free weights that can be used by the occupant to exercise. In such embodiments, the exerciser 71 may include a free-weight holder (e.g., rack) to hold the free weights when not in use. As another example, the exerciser 71 may comprise a fluidic (e.g., hydraulic or pneumatic) resistance mechanism providing pressure to be moved against by the occupant during exercising. In some cases, at least part of the cardiovascular exercising device 47 and at least part of the strength training device 48 of the exerciser 71 may be implemented by a common device.

Figure 28:
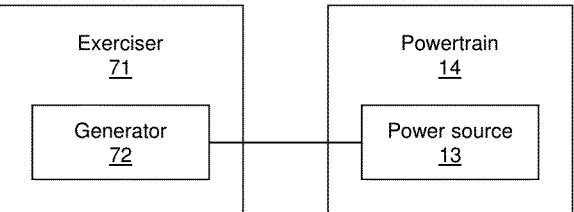

In some embodiments, as shown in FIG. 28, where the power source 13 of the powertrain 14 of the autonomous vehicle 10 comprises an electric motor powered by a battery, the exerciser 71 may be connected to the powertrain 14 of the vehicle 10 to recharge the battery. A generator 72 is drivable by the exerciser 71 to generate electrical power applied to the battery to recharge the battery. In some cases, the user interface 70 of the cabin 22 may indicate to the occupant how much power he/she has given to the vehicle 10 by exercising (e.g., an indication of watts, a range in kilometers or miles for the vehicle 10, etc.).

In some examples, at least part of the exercising facilitator $45_k$ providing the exerciser 71 may be movable between an exercising position, in which it is usable by the occupant to exercise, and a nonexercising (e.g., stowed) position, in which it is stowed (e.g., stored), concealed and/or otherwise not usable by the occupant to exercise. For example, in some embodiments, at least part of the exercising facilitator $45_k$ providing the exerciser 71 may be deployable (e.g., extendible) from the nonexercising position into the exercising position and retractable from the exercising position into the nonexercising position (e.g., in which it may be concealed by a door).

For instance, in some embodiments, the exerciser 71 may be movable between the exercising position, in which it extends to be engageable by the occupant while he/she is sitting on a seat $20_i$ (e.g., a driver's seat) so as to be usable by the occupant to exercise, and the nonexercising position, in which it clears (i.e., is unengageable by) the occupant while he/she is sitting on the seat $20_i$ so that the occupant is unimpeded by the exerciser 71. For example, in some embodiments, the exerciser 71 may be deployable from the exercising position, in which it is disposed in a recess (e.g., between adjacent ones of the seats $20_1$-$20_S$, below a dashboard of the user interface 70, etc.) into the exercising position to engage the occupant in the seat $20_i$ and retractable from the exercising position into the nonexercising position.

d) Eating

Figure 29:
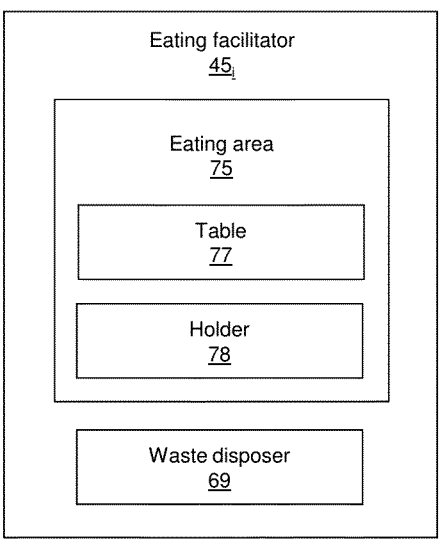

In some embodiments, as shown in FIG. 29, an occupant-act facilitator $45_m$ may be an eating facilitator configured to facilitate eating by an occupant in the cabin 22 by (e.g., altering the cabin 22 for) providing an eating area 75 for the occupant.

For example, in some embodiments, the eating facilitator $45_m$ providing the eating area 75 may comprise a table 77 (e.g., a tray or other flat support) on which the occupant can eat, such as by supporting food and tableware (e.g., dishes, glasses, knives, forks, etc.) used by the occupant.

In some embodiments, at least part of the eating facilitator $45_m$ providing the eating area 75 may be movable between an eating position, in which it is usable by the occupant to eat, and a noneating (e.g., stowed) position, in which it is stowed (e.g., stored), concealed and/or otherwise not usable by the occupant to eat. For example, in some embodiments, at least part of the eating facilitator $45_m$ providing the eating area 75 may be deployable (e.g., extendible) from the noneating position into the eating position and retractable from the eating position into the noneating position (e.g., in which it may be concealed by a door).

For instance, in some embodiments, the table 77 may be movable between the eating position, in which it extends over the occupant while he/she is sitting on a seat $20_i$ (e.g., a driver's seat) so as to be usable by the occupant to eat at the table 77, and the noneating position, in which it clears (i.e., does not extend over) the occupant while he/she is sitting on the seat $20_i$ so that the occupant is unimpeded by the table 77. Alternatively, in some embodiments, the table 77 may be movable between the eating position, in which it extends over an adjacent one of the seats $20_1$-$20_w$ (e.g., a passenger seat) that is adjacent to the seat $20_i$ of the occupant that can be rotated to face the table 77, and the noneating position, in which it clears (i.e., does not extend over) that adjacent seat. For example, in some embodiments, the table 77 may be deployable (e.g., extendible) from the noneating position, in which it is disposed in a recess (e.g., between adjacent ones of the seats $20_1$-$20_S$, below a dashboard of the user interface 70, etc.) into the eating position over the occupant in the seat $20_i$ and retractable from the eating position into the noneating position.

In some embodiments, the eating facilitator $45_m$ may comprise a holder 78 to hold the tableware on the table 77 while the vehicle 10 is in motion. For example, in some embodiments, the holder 78 may comprise a mechanical holder (e.g., a clamp, a recess, etc.) to abut and mechanically hold the tableware in place. In other embodiments, the holder 78 may comprise a magnetic holder, such as a magnet attracting an opposite magnet secured to (e.g., built into or adhesively bonded at an underside of) the tableware, to magnetically hold the tableware in place.

In some examples, the eating facilitator $45_m$ may comprise a waste disposer 69 to dispose of waste (i.e., garbage) such as what is not eaten by the occupant. For example, in some embodiments, the waster disposer 69 may comprise a garbage can configured to receive the waste, either directly or in a garbage bag placed in the can, and to be emptied. The garbage can may include a lid having a sealing mechanism to limit odors propagating in the cabin 22. As another example, in some embodiments, the waste disposer 69 may comprise a garburator to break apart the waste. In some cases, the garburator may receive water from a tank (e.g., filled by rain water falling onto the vehicle 10).

The waste disposer 69 may be located in the vehicle 10 so as to be vented (e.g., open to a vent exposed to ambient air outside the vehicle 10, such as at an underside of the vehicle 10). In various embodiments, the waste disposer 69 may be emptied by removing and emptying the garbage can manually or by pumping or otherwise emptying the garburator.

e) Cooking

Figure 30:
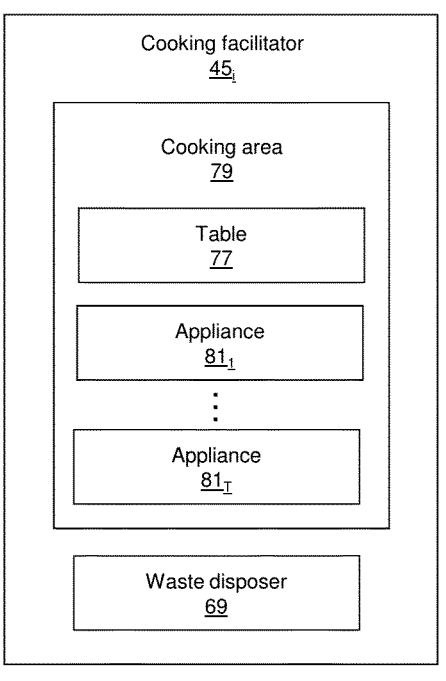

In some embodiments, as shown in FIG. 30, an occupant-act facilitator $45_n$ may be a cooking facilitator configured to facilitate cooking by an occupant in the cabin 22 by (e.g., altering the cabin 22 for) providing a cooking area 79 for the occupant.

For example, in some embodiments, the cooking facilitator $45_n$ providing the cooking area 79 may comprise the table 77 as discussed above that can be used by the occupant to cut, mix, and/or otherwise prepare food in addition to eating.

As another example, in some embodiments, the cooking facilitator $45_n$ providing the cooking area 79 may comprise one or more appliances $81_1$-$81_T$ configured to cook.

For instance, in some embodiments, an appliance $81_i$ may be an oven, stove, slow cooker, or grill (e.g., a microwave oven, an electric stove, an electric grill, etc.) or other heating appliance to cook by heat. In some cases, venting may be effected by opening one or more of the windows $21_1$-$21_W$ and/or by providing a vent associated with the heating appliance $81_i$.

In some embodiments, an appliance $81_j$ may be a refrigerator to refrigerate ingredients (e.g., produce, meat, fish, poultry, etc.) usable by the occupant to cook. In some cases, the refrigerator $81_j$ may be powered by a battery (e.g., dedicated to powering the refrigerator and recharged by a solar panel including photovoltaics).

In some examples, the cooking facilitator $45_n$ may comprise the waste disposer 69 configured to dispose of waste which is not used by the occupant when cooking.

In some embodiments, at least part of the cooking facilitator $45_n$ providing the cooking area 79 may be movable between a cooking position, in which it is usable by the occupant to cook, and a noncooking (e.g., stowed) position, in which it is stowed (e.g., stored), concealed and/or otherwise not usable by the occupant to cook. For example, in some embodiments, at least part of the cooking facilitator $45_2$ providing the cooking area 79 may be deployable (e.g., extendible) from the noncooking position into the cooking position and retractable from the cooking position into the noncooking position (e.g., in which it may be concealed by a door).

For instance, in some embodiments, the table 77 may be movable between the cooking position, in which it extends over the occupant while he/she is sitting on a seat $20_i$ (e.g., a driver's seat) so as to be usable by the occupant to cook at the table 77, and the noncooking position, in which it clears (i.e., does not extend over) the occupant while he/she is sitting on the seat $20_i$ so that the occupant is unimpeded by the table 77, or may be movable between the cooking position, in which it extends over an adjacent one of the seats $20_1$-$20_w$ (e.g., a passenger seat) that is adjacent to the seat $20_i$ of the occupant that can be rotated to face the table 77, and the noncooking position, in which it clears (i.e., does not extend over) that adjacent seat, as discussed above.

In some embodiments, an appliance $81_x$ may be movable between the cooking position, in which it can be used by the occupant while he/she is sitting on a seat $20_i$ (e.g., a driver's seat) to cook, and the noncooking position, in which it is stowed, concealed and/or otherwise unusable by the occupant while he/she is sitting on the seat $20_i$. For example, in some embodiments, the appliance $81_x$ may be deployable (e.g., extendible) from the noncooking position, in which it is disposed in a recess (e.g., between adjacent ones of the seats $20_1$-$20_S$, below a dashboard of the user interface 70, etc.) into the cooking position for the occupant in the seat $20_i$ and retractable from the cooking position into the noncooking position.

In some cases, an occupant-act facilitator $45_x$ (e.g., the window covering 23, the window transmissivity changer 25, the noise canceller 59, the desk 65, the computer mount 66, the exerciser 71, the one or more appliances $81_1$-$81_T$, etc.) may be built into (i.e., integrated in) the cabin 22 during original manufacturing of the autonomous vehicle 10 (e.g., below a dashboard, on a console of the user interface 70, on or between a given one of the seats $20_1$-$20_S$, etc.).

Figure 31:
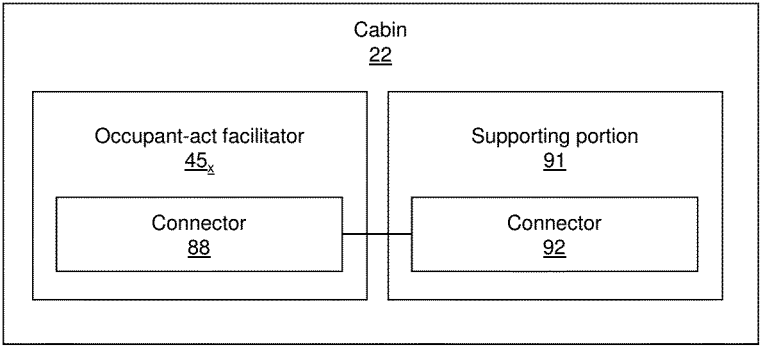

In other cases, an occupant-act facilitator $45_x$ (e.g., the window covering 23, the window transmissivity changer 25, the noise canceller 59, the desk 65, the computer mount 66, the exerciser 71, the one or more appliances $81_1$-$81_T$, etc.) may be configured to be installed in the cabin 22 after original manufacturing of the vehicle 10 (e.g., an aftermarket device installable in the cabin 22 by an owner or leaser of the vehicle 10). For example, in some embodiments, as shown in FIG. 31, the occupant-act facilitator $45_x$ may comprise a connector 88 configured to connect the occupant-act facilitator $45_x$ to a supporting portion 91 of the cabin 22 (e.g., a wall of the cabin 22 below a dashboard, adjacent to a console of the user interface 70, on or between a given one of the seats $20_1$-$20_S$, etc.). The connector 88 may comprise one or more fasteners, such as screws, bolts, hook-and-loop (e.g., Velcro) fasteners, clips, clamps, and/or any other fastening device.

In some examples, the supporting portion 91 of the cabin 22 may comprise a connector 92 complimentary to and configured to engage and interconnect with the connector 88 of the occupant-act facilitator $45_x$ (e.g., one or more (e.g., threaded) openings, clips, latches, etc.). For instance, in some embodiments, the connector 92 of the supporting portion 91 of the cabin 22 may be built into (i.e., integrated into) the cabin 22 during original manufacturing of the autonomous vehicle 10. Alternatively, in some embodiments, the connector 92 of the supporting portion 91 of the cabin 22 may be configured to be installed in the cabin 22 after original manufacturing of the vehicle 10 along with the occupant-act facilitator $45_x$.

5. Automatic Personalization for Occupant

In some embodiments, as shown in FIGS. 40 and 41, the vehicle 10 may be personalized for an occupant based on an identity of the occupant, such that one or more aspects of the vehicle 10, like a configuration of the cabin 22, the self-driving mode of the control system 15 of the vehicle 10, a destination and/or a route of the vehicle 10, and/or other aspects of the vehicle 10, are adjusted based on the identity of the occupant.

For instance, this may be useful where different occupants use the vehicle 10 at different times, whether the vehicle 10 is a private one (e.g., which may be used by parents and their children) or a public one used as part of a taxi, ride-hailing or vehicle-sharing service.

More particularly, in this embodiment, the control system 15 is configured to receive an identifier 121 indicative of the identity of the occupant and to adjust one or more aspects of the vehicle 10 based on the identity of the occupant. For example, in some embodiments, the identifier 121 may include a name, a code, or other identification information input by the occupant. As another example, in some embodiments, the identifier 121 may include a biometric of the occupant, such as a picture, fingerprint, voice print, etc.

In some cases, the identifier 121 may be input by the occupant via the user interface 70 of the cabin 22 (e.g., using buttons, a camera or other biometric reader, etc.), In other cases, the identifier 121 may be transmitted from a personal device carried by the occupant, such as a smartphone or other wireless phone, a tablet computer, a head-mounted display, smartwatch or other wearable device, etc., to the communication interface 68 of the vehicle 10.

Figure 42:
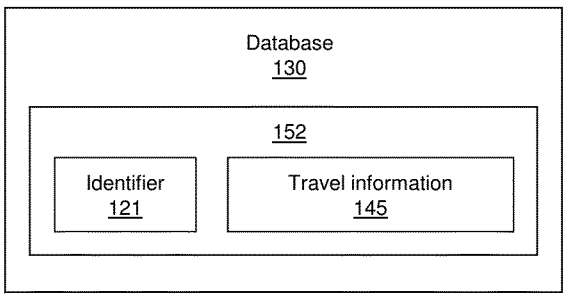

Upon receiving the identifier 121, the controller 80 of the vehicle 10 adjusts one or more aspects of the vehicle 10 based on the identity of the occupant. For instance, in some embodiments, as shown in FIG. 42, a database 130 may store a record 152 including the identifier 121 of the occupant and travel information 145, which may be indicative of a self-driving preference, a route, a destination, etc., of the occupant when travelling in the vehicle 10. The database 130 can store multiple such records including identifiers of various individuals who may travel in the vehicle 10 and travel information, which may be indicative of preferences, routes, destinations, etc., of these individuals when travelling in the vehicle 10, so that one or more aspects of the vehicle 10 may be adjusted based on identities of these various individuals when they are occupants. In some cases, the database 130 may be part of the controller 80 of the vehicle 10. In other cases, the database 130 may be part of a server external to the vehicle 10 and accessible by the controller 80 via the communication interface 68 of the vehicle 10.

For example, in some embodiments, based on the travel information 145 associated with the identifier 121 of the occupant, the controller 80 may:

alter the cabin 22 (e.g., a seat $20_i$, reduce stimuli (e.g., light, noise, vibrations, etc.) from the vehicle 10 and/or its environment, deploy one or more of the occupant-act facilitators $45_1$-$45_D$, etc.), such as discussed above, based on one or more preferences of the occupant;

alter the self-driving mode of the vehicle 10, such as by reducing potential for sudden or abrupt movements (e.g., acceleration, braking, turning, shaking, etc.) of the vehicle 10 on the road 11, based on one or more preferences of the occupant;

set a destination and/or a route for the vehicle 10, based on one or more preferences of the occupant (e.g., a home address when entering the vehicle 10 after work or school hours, at night, etc.); and/or adjust any other aspect of the vehicle 10 based on the identity of the occupant.

In other embodiments, information to personalize the vehicle 10 based on the identity of the occupant like the travel information 145 may be stored in a personal device carried by the occupant, such as a smartphone or other wireless phone, a tablet computer, a head-mounted display, smartwatch or other wearable device, etc., and transmitted to the controller 80 of the vehicle 10 via the communication interface 68.

Figure 32:
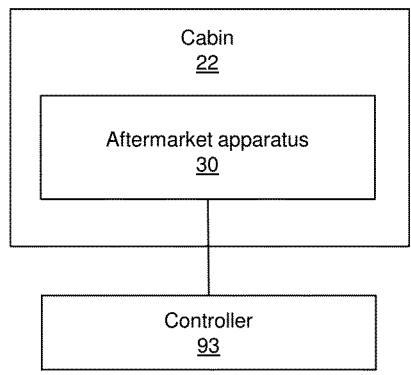
FIG. 32 shows an embodiment of an aftermarket apparatus installable in the cabin of the autonomous vehicle.

In some embodiments, as shown in FIG. 32, one or more systems, devices and/or other components discussed above (e.g., the window covering 23, the window transmissivity changer 25, and/or other components of the light-control system 55; the noise canceller 59 and/or other components of the noise-control system 57; the desk 65, the computer mount 66, the exerciser 71, the one or more appliances $81_1$-$81_T$, and/or other components of the occupant-act facilitators $45_1$-$45_D$; one or more of the sensors $75_1$-$75_P$; etc.) may be an aftermarket apparatus 30 configured to be installed in the cabin 22 after original manufacturing of the vehicle 10 and, in some cases, may be configured to be automatically controlled by a controller 93 that is implemented after original manufacturing of the vehicle 10.

The controller 93 may function as discussed above in respect of the controller 80 of the control system 15 of the autonomous vehicle 10. For example, in various embodiments, the controller 93 may be configured to monitor the interior of the cabin 22 and, in response to detecting an actionable event in the cabin 22, cause the vehicle 10 to autonomously reroute itself, cause issuance of a notification 85 to a communication device 87 external to the vehicle 10, cause the cabin 22 to be altered, cause the self-driving mode of the vehicle 10 to be altered, cause the vehicle 10 to autonomously perform one or more actions based interactions with (e.g., gestures of) humans external to the vehicle 10, etc., as discussed above in respect of the controller 80.

Figure 33:
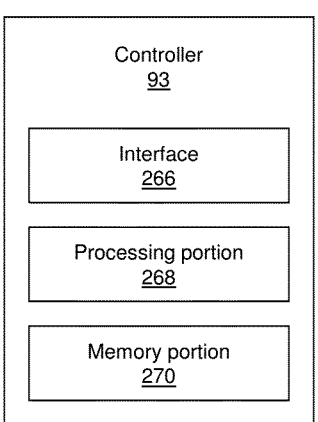
FIG. 33 shows an embodiment of a controller for the aftermarket apparatus.

In some embodiments, as shown in FIG. 33, the controller 93 comprises an interface 266, a processing portion 268, and a memory portion 270, which are implemented by suitable hardware and software.

The interface 266 comprises one or more inputs and outputs allowing the controller 93 to receive input signals from and send output signals to other components to which the controller 93 is connected (i.e., directly or indirectly connected), including the aftermarket apparatus 30 (e.g., which may include one or more of: the window covering 23, the window transmissivity changer 25, and/or other components of the light-control system 55; the noise canceller 59 and/or other components of the noise-control system 57; the desk 65, the computer mount 66, the exerciser 71, the one or more appliances $81_1$-$81_T$, and/or other components of the occupant-act facilitators $45_1$-$45_D$); one or more of the sensors $75_1$-$75_P$; the powertrain 14; the steering system 16; the user interface 70; the communication interface 68; etc.

The processing portion 268 comprises one or more processors for performing processing operations that implement functionality of the controller 93. A processor of the processing portion 268 may be a general-purpose processor executing program code stored in the memory portion 270. Alternatively, a processor of the processing portion 268 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 270 comprises one or more memories for storing program code executed by the processing portion 268 and/or data (e.g., maps, vehicle parameters, etc.) used during operation of the processing portion 268. A memory of the memory portion 270 may be a semiconductor medium (including, e.g., a solid-state memory), a magnetic storage medium, an optical storage medium, and/or any other suitable type of memory. A memory of the memory portion 270 may be read-only memory (ROM) and/or random-access memory (RAM), for example.

In some embodiments, the controller 93 may comprise and/or interact with one or more other control units of the autonomous vehicle 10. For example, in some embodiments, the controller 93 may comprise and/or interact with a powertrain control unit of the powertrain 14, such as an engine control unit (ECU), a transmission control unit (TCU), etc.

In some cases, the controller 93 may be configured to be installed and implemented into the vehicle 10 after original manufacturing of the vehicle 10 (e.g., an aftermarket device installable and implementable in the vehicle 10 by an owner or leaser of the vehicle 10).

For example, in some embodiments, software implementing functionality of the controller 93 may be downloaded onto the memory portion 170 of the controller 80 built into the vehicle 10 during original manufacturing of the vehicle 10 such that the controller 80 becomes the controller 93 (i.e., the interface 166, the processing portion 168 and the memory portion 170 of the controller 80 respectively become the interface 266, the processing portion 268 and the memory portion 270 of the controller 93).

As another example, in some embodiments, the controller 93 may a standalone controller that is separate from the controller 80 of the control system 15 of the vehicle 10 and provided together with the aftermarket apparatus 30 that is it configured to control (e.g., the window covering 23, the window transmissivity changer 25, and/or other components of the light-control system 55; the noise canceller 59 and/or other components of the noise-control system 57; the desk 65, the computer mount 66, the exerciser 71, the one or more appliances $81_1$-$81_T$, and/or other components of the occupant-act facilitators $45_1$-$45_D$; one or more of the sensors $75_1$-$75_P$; etc.), as part of an aftermarket kit.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A vehicle comprising: a cabin; and a control system configured to autonomously drive the vehicle, monitor an environment of the vehicle, detect a gesture of a human who is outside and controls traffic in the environment of the vehicle, determine that the gesture of the human encodes a command for the vehicle to leave a lane in which the vehicle is located, and autonomously move the vehicle out of the lane based on the command encoded by the gesture of the human; wherein the control system is further configured to detect a scene of an accident from the environment of the vehicle at the scene of the accident and autonomously move the vehicle relative to the lane based on the scene of the accident; wherein, to autonomously move the vehicle relative to the lane based on the scene of the accident, the control system is configured to autonomously return the vehicle to the lane based on the scene of the accident; wherein, to autonomously move the vehicle relative to the lane based on the scene of the accident, the control system is configured to determine a distance from the scene of the accident and autonomously move the vehicle relative to the lane based on the distance from the scene of the accident.

2. The vehicle of claim 1, wherein: the lane is a first lane; the command encoded by the gesture of the human is for the vehicle to go from the first lane to a second lane; and, to autonomously move the vehicle out of the lane based on the command encoded by the gesture of the human, the control system is configured to autonomously move the vehicle from the first lane to the second lane based on the command encoded by the gesture of the human.

3. The vehicle of claim 2, wherein the second lane is adjacent to the first lane.

4. The vehicle of claim 2, wherein the second lane is opposite to the first lane.

5. The vehicle of claim 1, wherein the control system is configured to determine a re-entry point of the vehicle into the lane based on surroundings of the vehicle other than any gesturing of the human and autonomously return the vehicle to the lane at the re-entry point of the vehicle into the lane.

6. The vehicle of claim 1, wherein, to detect the scene of the accident from the environment of the vehicle at the scene of the accident, the control system is configured to detect at least one of vehicular shape distortions, vehicular position distortions, color anomalies, and broken glass in the environment of the vehicle at the scene of the accident.

7. The vehicle of claim 1, wherein, to detect the scene of the accident from the environment of the vehicle at the scene of the accident, the control system is configured to detect an ambulance in the environment of the vehicle at the scene of the accident.

8. The vehicle of claim 1, wherein, before autonomously moving the vehicle out of the lane based on the command encoded by the gesture of the human, the control system is configured to confirm an authority of the human to provide the command.

9. The vehicle of claim 8, wherein, to confirm the authority of the human to provide the command, the control system is configured to detect at least one of a uniform and equipment of the human.

10. The vehicle of claim 1, wherein: the gesture of the human includes a movement of at least one of an arm and a hand of the human; and the control system is configured to detect the gesture of the human by capturing at least one image of the movement of the at least one of the arm and the hand of the human and applying a gesture recognition algorithm to the at least one image to recognize the gesture.

11. A vehicle comprising: a cabin; and a control system configured to autonomously drive the vehicle, monitor an environment of the vehicle, detect a gesture of a human external to the vehicle from the environment of the vehicle, determine that the gesture of the human external to the vehicle encodes a command directed to the vehicle, detect a scene of an accident from the environment of the vehicle at the scene of the accident, and control autonomous driving of the vehicle based on the command encoded by the gesture of the human external to the vehicle and the scene of the accident, wherein, to control the autonomous driving of the vehicle based on the command encoded by the gesture of the human external to the vehicle and the scene of the accident, the control system is configured to autonomously move the vehicle out of a lane based on the command encoded by the gesture of the human external to the vehicle, determine a distance from the scene of the accident, and autonomously move the vehicle relative to the lane based on the distance from the scene of the accident.

12. The vehicle of claim 11, wherein: the command encoded by the gesture of the human external to the vehicle commands the vehicle to leave the lane.

13. The vehicle of claim 12, wherein: the lane is a first lane; the command encoded by the gesture of the human external to the vehicle commands the vehicle to go from the first lane to a second lane; and, to autonomously move the vehicle out of the lane based on the command encoded by the gesture of the human external to the vehicle, the control system is configured to autonomously move the vehicle from the first lane to the second lane based on the command encoded by the gesture of the human external to the vehicle.

14. The vehicle of claim 12, wherein, to control the autonomous driving of the vehicle based on the command encoded by the gesture of the human external to the vehicle and the scene of the accident, the control system is configured to autonomously return the vehicle to the lane based on the scene of the accident.

15. The vehicle of claim 13, wherein, to control the autonomous driving of the vehicle based on the command encoded by the gesture of the human external to the vehicle and the scene of the accident, the control system is configured to autonomously move the vehicle along the second lane based on the command encoded by the gesture of the human external to the vehicle and return the vehicle to the first lane based on the scene of the accident.

16. The vehicle of claim 13, wherein the second lane is opposite to the first lane.

17. The vehicle of claim 11, wherein the control system is configured to determine a re-entry point of the vehicle into the lane based on surroundings of the vehicle other than any gesturing of the human external to the vehicle and autonomously return the vehicle to the lane at the re-entry point of the vehicle into the lane.

18. The vehicle of claim 11, wherein, to detect the scene of the accident from the environment of the vehicle at the scene of the accident, the control system is configured to detect at least one of vehicular shape distortions, vehicular position distortions, color anomalies, broken glass, and an ambulance in the environment of the vehicle at the scene of the accident.

19. The vehicle of claim 11, wherein, before autonomously moving the vehicle out of the lane based on the command encoded by the gesture of the human external to the vehicle, the control system is configured to confirm that the human external to the vehicle is a police officer.

20. A vehicle comprising: a cabin; and a control system configured to autonomously drive the vehicle, monitor an environment of the vehicle, detect a gesture of a human external to the vehicle from the environment of the vehicle, determine that the gesture of the human external to the vehicle encodes a command for the vehicle to override a driving rule where the vehicle is located, autonomously move the vehicle based on the command encoded by the gesture of the human external to the vehicle such that the vehicle overrides the driving rule while autonomously driven, detect a scene of an accident from the environment of the vehicle at the scene of the accident, and autonomously move the vehicle based on the scene of the accident such that the vehicle ceases to override the driving rule and is autonomously driven consistent with the driving rule; wherein, to autonomously move the vehicle based on the command encoded by the gesture of the human external to the vehicle such that the vehicle overrides the driving rule while autonomously driven, the control system is configured to autonomously move the vehicle out of a lane based on the command encoded by the gesture of the human external to the vehicle; wherein, to autonomously move the vehicle based on the scene of the accident such that the vehicle ceases to override the driving rule and is autonomously driven consistent with the driving rule, the control system is configured to determine a distance from the scene of the accident and autonomously move the vehicle relative to the lane based on the distance from the scene of the accident.

* * * * *